United States Patent
Izawa et al.

(10) Patent No.: US 12,147,103 B2
(45) Date of Patent: Nov. 19, 2024

(54) DISPLAY DEVICE AND STORING BODY

(71) Applicant: Japan Display Inc., Tokyo (JP)

(72) Inventors: Mao Izawa, Tokyo (JP); Masaaki Takuma, Tokyo (JP)

(73) Assignee: Japan Display Inc., Tokyo (JP)

( * ) Notice: Subject to any disclaimer, the term of this patent is extended or adjusted under 35 U.S.C. 154(b) by 262 days.

(21) Appl. No.: 17/677,143

(22) Filed: Feb. 22, 2022

(65) Prior Publication Data

US 2022/0179258 A1 Jun. 9, 2022

Related U.S. Application Data

(63) Continuation of application No. PCT/JP2020/030455, filed on Aug. 7, 2020.

(30) Foreign Application Priority Data

Aug. 27, 2019 (JP) .................................. 2019-154632

(51) Int. Cl.
G02F 1/1333 (2006.01)
G02F 1/13357 (2006.01)

(52) U.S. Cl.
CPC .. *G02F 1/133328* (2021.01); *G02F 1/133603* (2013.01); *G02F 1/133605* (2013.01)

(58) Field of Classification Search
CPC ......... G02F 1/133328; G02F 1/133603; G02F 1/133605; G02F 2202/28; G02F 1/133305; G02F 1/133317; G02F 1/133314; G09F 9/00
See application file for complete search history.

(56) References Cited

U.S. PATENT DOCUMENTS

| | | | |
|---|---|---|---|
| 2015/0062840 A1 | 3/2015 | Kim | |
| 2018/0275722 A1 | 9/2018 | Lo | |
| 2019/0114010 A1* | 4/2019 | Chiu | G06F 1/1601 |
| 2020/0096808 A1* | 3/2020 | Xu | G02F 1/133308 |
| 2020/0341187 A1* | 10/2020 | Li | G02F 1/133328 |
| 2020/0387032 A1* | 12/2020 | Guo | G02B 6/0088 |

FOREIGN PATENT DOCUMENTS

| | | |
|---|---|---|
| JP | 2000-019510 A | 1/2000 |
| JP | 2008-181466 A | 8/2008 |
| JP | 2010-008815 A | 1/2010 |
| JP | 2013-134295 A | 7/2013 |
| JP | 2015-219387 A | 12/2015 |

OTHER PUBLICATIONS

Search Report issued in International Patent Application No. PCT/JP2020/030455 on Nov. 2, 2020 and English translation of same. 5 pages.

Written Opinion issued in International Patent Application No. PCT/JP2020/030455 on Nov. 2, 2020. 3 pages.

* cited by examiner

*Primary Examiner* — Kevin Quarterman
(74) *Attorney, Agent, or Firm* — K&L Gates LLP

(57) ABSTRACT

According to one embodiment, a casing accommodating a display panel and a illumination device includes a bottom portion supporting the illumination device, a first edge part and a second edge part, a third edge part extending along a first direction at a position between the first edge part and the second edge part, a first locking portion provided at the first edge part, and a second locking portion provided at the second edge part, wherein a first adhesive member adheres the display panel to the first locking portion, a second adhesive member adheres the display panel to the second locking portion.

10 Claims, 31 Drawing Sheets

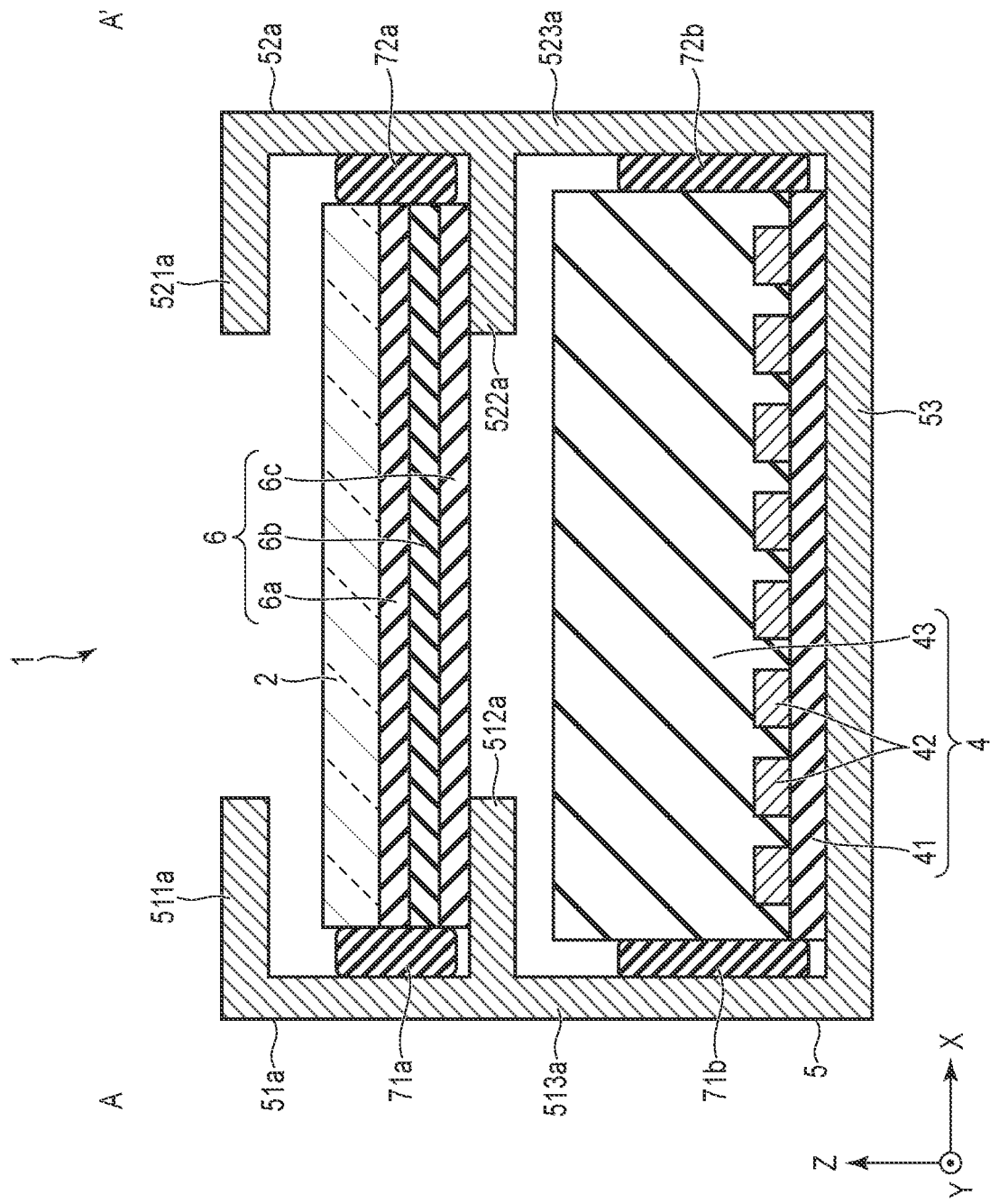
F I G. 4

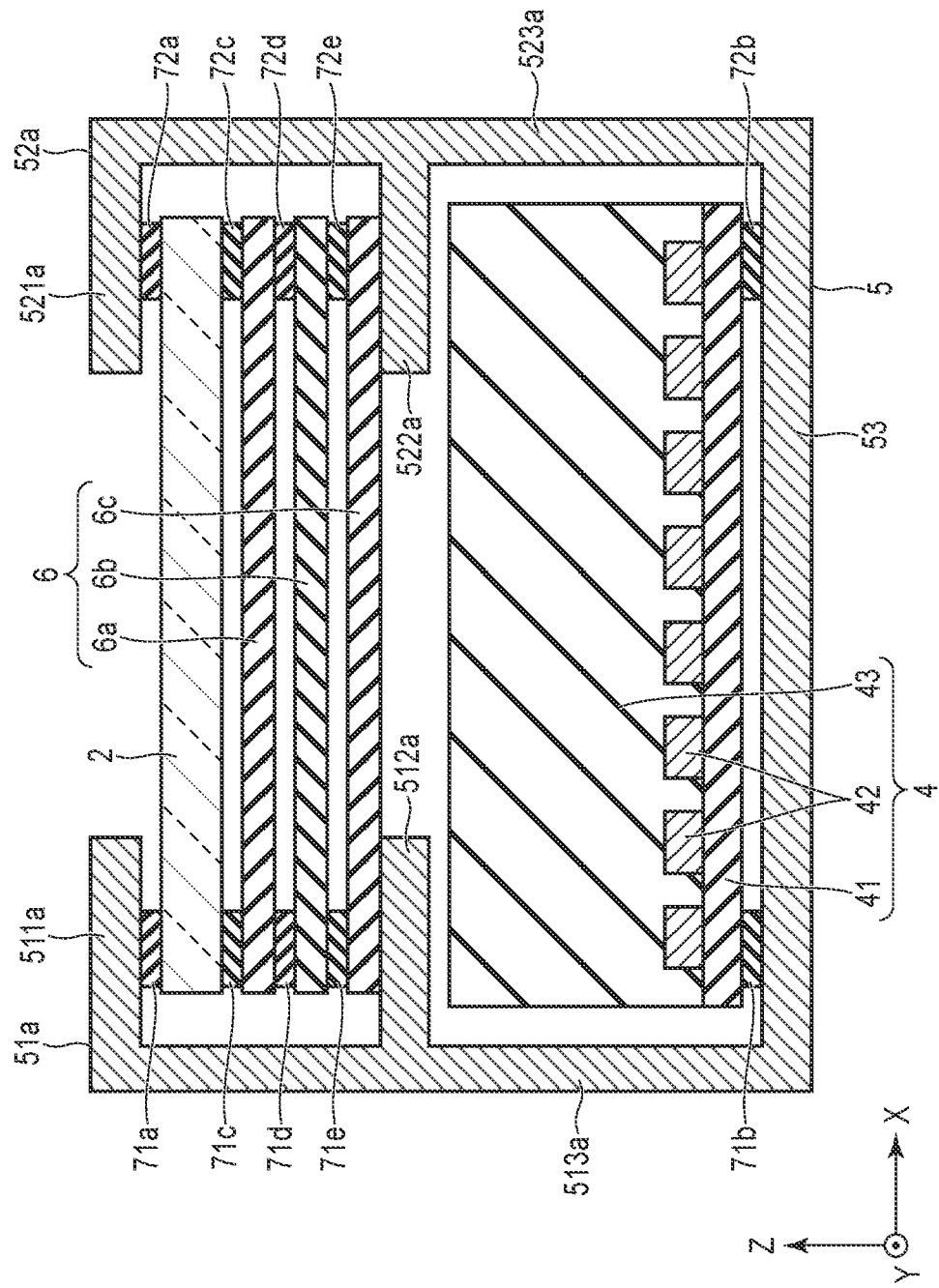
F.I.G. 9

DISPLAY DEVICE AND STORING BODY

CROSS-REFERENCE TO RELATED APPLICATIONS

This application is a Continuation Application of PCT Application No. PCT/JP2020/030455, filed Aug. 7, 2020, and based upon and claiming the benefit of priority from Japanese Patent Application No. 2019-154632, filed Aug. 27, 2019, the entire contents of all of which are incorporated herein by reference.

FIELD

Embodiments described herein relate generally to a display device and a storing body.

BACKGROUND

Liquid crystal display devices include illumination devices overlapping display panels in a number of casings. For example, in a transmissive liquid crystal display device, an illumination device is arranged on a back surface of a display panel. In such a display device, the display panel and the illumination device are fixed by, for example, a double-sided tape arranged along an outer periphery of the display panel, or the like. When both the display panel and the illumination device are flexible, the display device can be bent and stretched together with the display region. However, when the display panel and the illumination device are fixed as described above, it is difficult to deform the display device while keeping the distance between the display panel and the illumination device constant.

BRIEF DESCRIPTION OF THE DRAWINGS

FIG. 4 is a cross-sectional view taken along line A-A' shown in FIG. 3.

FIG. 9 is a cross-sectional view showing the other example of the display panel 1.

DETAILED DESCRIPTION

Figure 1:
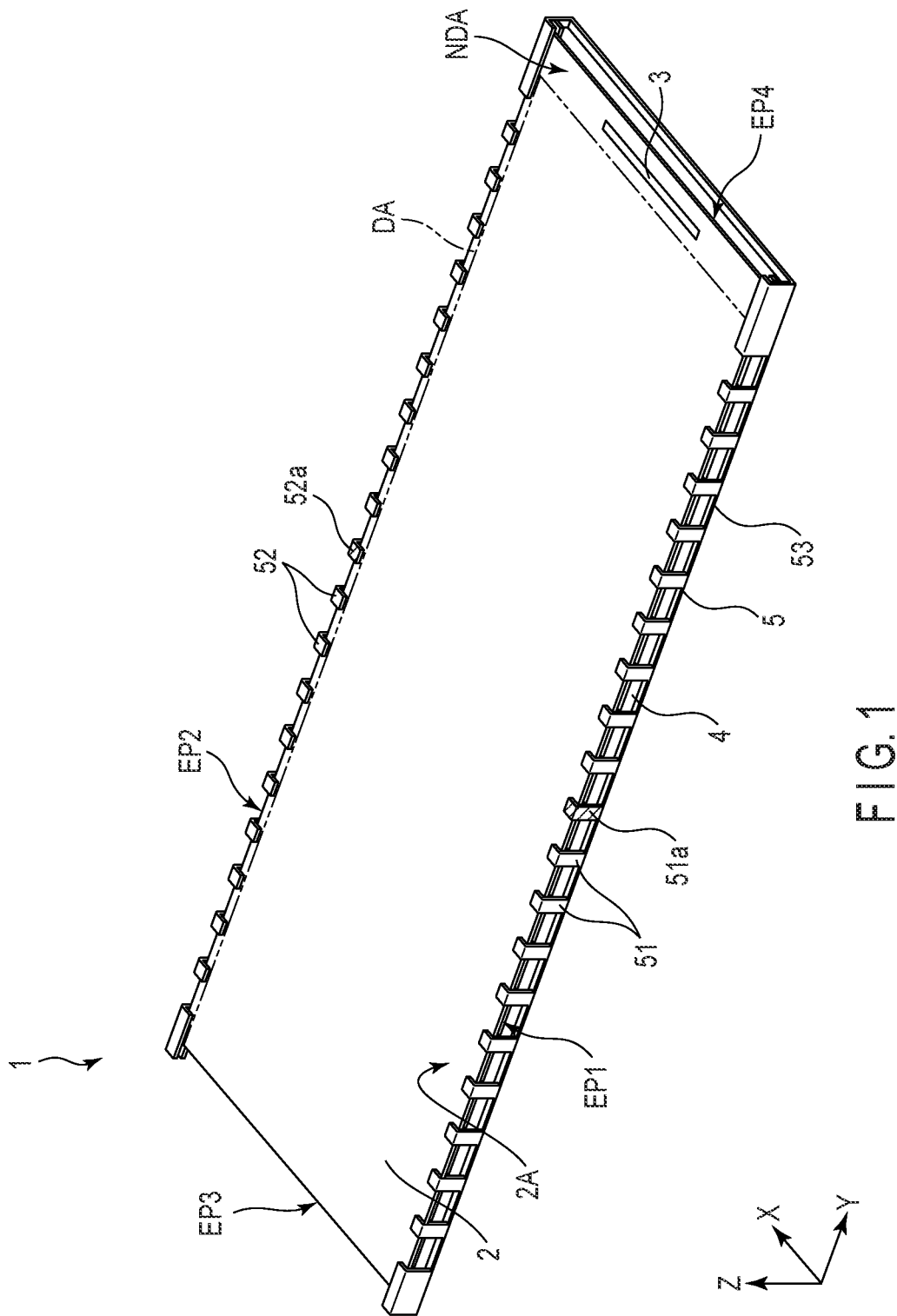
FIG. 1 is a perspective view showing an example of a display device 1 of a first embodiment.

In general, according to one embodiment, a display device comprises: a display panel; an illumination device overlapping the display panel; a casing accommodating the display panel and the illumination device; and a first adhesive member and a second adhesive member adhering the display panel and the illumination device to the casing, the casing including: a bottom portion supporting the illumination device; a first edge part and a second edge part arranged in a first direction and extending along a second direction intersecting the first direction; a third edge part extending along the first direction at a position between the first edge part and the second edge part; a first locking portion provided at the first edge part; and a second locking portion provided at the second edge part, wherein the first adhesive member adheres the display panel to the first locking portion, the second adhesive member adheres the display panel to the second locking portion, the first locking portion and the second locking portion are located equidistantly from the third edge part in the second direction.

According to another embodiment, a display device comprises: a display panel; an illumination device overlapping the display panel; a casing accommodating the display panel and the illumination device; and a first adhesive member and a second adhesive member adhering the display panel and the illumination device to the casing, the casing including: a first locking portion including a first lug and a third lug sandwiching the display panel; and a second locking portion arranged opposite to the first locking portion and including a second lug and a fourth lug sandwiching the display panel, wherein the first adhesive member adheres the display panel and the illumination device to the first locking portion, the second adhesive member adheres the display panel and the illumination device to the second locking portion, the first locking portion and the second locking portion are arranged along a bending axis.

According to yet another embodiment, a storing body comprises: a bottom portion; a first edge part and a second edge part arranged along a firsts direction and extending in a second direction intersecting the first direction; a plurality of first locking portions provided at the first edge part; a plurality of second locking portions provided at the second edge part and opposed to the plurality of first locking portions in the first direction; and adhesive members being provided at one of the plurality of first locking portions, and one of the plurality of second locking portions opposed to the one of the plurality of first locking portions, respectively, wherein the first locking portion and the second locking portion are arranged at regular intervals in the second direction, the first locking portion includes a first side wall extending in a third direction intersecting the first direction and the second direction, and a first lug protruding from the first side wall toward the second edge part side, the second locking portion includes a second side wall extending in the third direction, and a second lug protruding from the second side wall toward the first edge part side, the first lug and the second lug are located equidistantly from the bottom portion in the third direction.

According to the embodiments, a display device capable of improving the display quality and a housing body thereof can be provided.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some casings, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

EMBODIMENTS

First Embodiment

FIG. 1 is a perspective view showing an example of a display device 1 of a first embodiment. The first direction X, the second direction Y, and the third direction Z shown in the figure are orthogonal to each other, but may intersect at an angle other than 90 degrees. In the following description, the direction toward the tip of the arrow indicating the third direction Z is referred to as "upward", and the direction opposite from the tip of the arrow is referred to as "downward". According to "a second member on/above a first member" and "a second member under/below a first member", the second member may be in contact with the first member or may be remote from the first member. In addition, viewing an X-Y plane defined by the first direction X and the second direction Y from the pointing end side of the arrow indicating the third direction Z is referred to as planar view.

A liquid crystal display device comprising a liquid crystal layer will be described as an example of a display device in the embodiment. The liquid crystal display device can be used for, for example, various devices such as smartphones, tablet terminals, mobile telephone terminals, notebook-type personal computers, in-vehicle devices, and game consoles. The display device 1 comprises a display panel 2, an IC chip 3, an illumination device 4, and a casing 5 (storing body).

The display panel 2 is, for example, an active-matrix liquid crystal display panel. In the example illustrated, the display panel 2 has a substantially rectangular shape. In other words, the display panel 2 includes edge parts EP1 and EP2 extending along the second direction Y and edge parts EP3 and EP4 extending along the first direction X. For example, lengths of the edge parts EP1 and EP2 are larger than lengths of the edge parts EP3 and EP4. In addition, the display panel 2 includes a display region DA where an image is displayed, and a non-display region NDA which surrounds the display region DA. The display region DA corresponds to a region provided with a liquid crystal layer as a display element, and includes a plurality of pixels (not shown). The pixel refers to the smallest unit that can be individually controlled with respect to a video signal. The non-display region NDA is located outside the display region DA. In the example illustrated, it is a frame-shaped region surrounding the display region DA. In this embodiment, the display panel 2 has flexibility.

The IC chip 3 functions as a signal supply source that supplies signals necessary to drive the display panel 2. In the example illustrated, the IC chip 3 is mounted along the edge part EP4 in the non-display region NDA. Incidentally, the IC chip 3 may have all or several parts of its functions mounted on, for example, a flexible wiring board mounted on the display panel 2.

The illumination device 4 has a substantially rectangular shape having substantially the same size as the display panel 2, and overlaps the display panel 2. In the example illustrated, the illumination device 4 is located below the display panel 2. In other words, the display panel 2 displays an image by causing the light from the illumination device 4 to be transmitted selectively. In the present embodiment, the illumination device 4 has flexibility.

The casing 5 accommodates the display panel 2 and the illumination device 4. The casing 5 is formed of, for example, a metal such as aluminum or a resin, and has flexibility. The casing 5 includes a plurality of locking portions 51 and 52 for locking the display panel 2 and the illumination device 4, and a flat plate-shaped bottom portion 53. The bottom portion 53 has a substantially rectangular shape having substantially the same size as the illumination device 4, and supports the illumination device 4. The locking portions 51 are provided on the edge part EP1 side and are arranged along the second direction Y. The locking portions 52 are provided on the edge part EP2 side and are arranged along the second direction Y. The adjacent locking portions 51 are separated from each other, and the adjacent locking portions 52 are separated from each other. Each of the locking portions 51 and 52 extends from the bottom portion 53 in the third direction Z along the side surfaces of the display panel 2 and the illumination device 4, and one end thereof is bent to overlap an upper surface 2A of the display panel 2. In the example illustrated, the locking portions 51 and 52 are arranged at equal intervals in the first direction X, and the number of locking portions 51 and the number of locking portions 52 are equal to each other. The locking portions 51 and the locking portions 52 are opposed to each other along the first direction X.

The display panel 2 and the illumination device 4 are adhered to the casing 5 by adhesive member (not shown). The adhesive member is, for example, an adhesive or double-sided tape. The adhesive members are provided on a pair of a locking portion 51a (first locking portion) and a locking portion 52a (second locking portion), as represented by hatch lines in the figure. The locking portions 51a and 52a are locking portions located at a center of a width of the display device 1 along the second direction Y. The adhesive members adheres the display panel 2 and the illumination device 4 to the locking portion 51a on the edge part EP1 side, and adhere the display panel 2 and the illumination device 4 to the locking portion 52a on the edge part EP2 side. Since the locking portion 51a and the locking portion 52a are arranged along the first direction X, the adhesive members are also arranged along the first direction X. In other words, the positions where the display panel 2 and the illumination device 4 are fixed to the casing 5 are arranged along the first direction X. For this reason, the display device 1 can be bent and stretched around a bending axis parallel to the first direction X.

Figure 2:
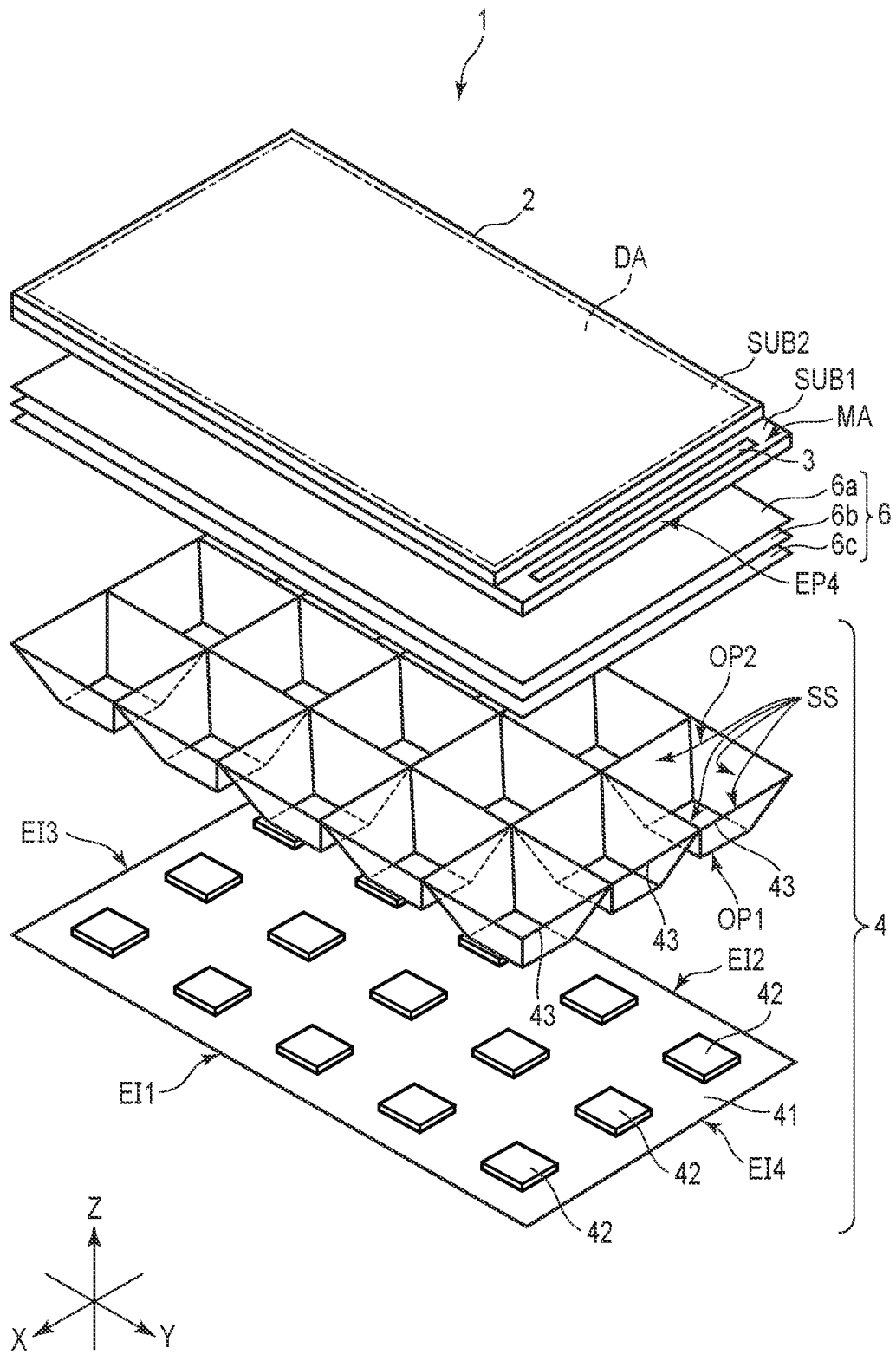
FIG. 2 is an exploded perspective view showing the display device 1 shown in FIG. 1.

FIG. 2 is an exploded perspective view showing the display device 1 shown in FIG. 1. The display device 1 comprises an optical sheet 6 (6a, 6b, and 6c) in addition to the display panel 2, the IC chip 3, the illumination device 4, and the casing 5. The optical sheet 6 is located between the display panel 2 and the illumination device 4. The optical sheet 6a is located on the display panel 2 side. The optical sheet 6a is, for example, a prism sheet. The optical sheet 6b is located between the optical sheet 6a and the optical sheet 6c. The optical sheet 6b is, for example, a diffusion sheet. The optical sheet 6c is located on the illumination device 4 side. The optical sheet 6c is, for example, a phosphor sheet. The optical sheets 6a, 6b, and 6c are formed to have substantially the same size and the same shape as the display panel 2, and overlap at least the whole display region DA. Incidentally, the phosphor sheet may be omitted. In addition, not only one diffusion sheet but also a plurality of diffusion sheets may be arranged. In this case, more uniform light can be extracted.

The display panel 2 includes a first substrate SUB1, a second substrate SUB2, and a liquid crystal layer (not shown). Each of the first substrate SUB1 and the second substrate SUB2 is, for example, a flexible substrate formed of a transparent organic insulating material such as polyimide. The first substrate SUB1 and the second substrate SUB2 are opposed along the third direction Z and are bonded to each other with a sealing material. The liquid crystal layer is provided in an inner region surrounded by a sealing material, between the first substrate SUB1 and the second substrate SUB2. The first substrate SUB1 includes a mounting portion MA that does not overlap the second substrate SUB2. In the example illustrated, the mounting portion MA is provided along the edge part EP4 of the display panel 2. The IC chip 3 is mounted on the mounting portion MA.

The illumination device 4 comprises a circuit board 41, light sources 42, and light guide parts 43. The circuit board 41 is a flexible board, and is formed to have substantially the same size and the same shape as the display panel 2. In other words, the circuit board 41 includes edge parts EI1 and EI2 arranged along the first direction X and extending along the second direction Y, and edge parts EI3 and EI4 arranged along the second direction Y and extending along the first direction X. For example, the light source 42 includes at least one light emitting element such as a light emitting diode (LED). The light sources 42 are mounted on a substantially whole surface of the circuit board 41. In the example illustrated, the light sources 42 are arrayed in a matrix in the first direction X and the second direction Y. The light guide parts 43 are arrayed in a matrix so as to be opposed to the respective light sources 42. The light guide parts 43 are formed in a truncated pyramid shape so as to guide the light emitted from the light sources 42 toward the optical sheet 6c. More specifically, the light guide part 43 includes side surfaces SS surrounding the light source 42, and openings OP1 and OP2 defined by the side surfaces SS. The opening OP1 is opposed to the light source 42. The opening OP2 is opposed to the optical sheet 6c. The area of the opening OP2 is larger than the area of the opening OP1. In the example illustrated, the openings OP1 and OP2 are shaped in a quadrangle. Incidentally, the shape of the light guide part 43 is not limited to the example illustrated. The shape of the openings OP1 and OP2 may be a polygon other than a quadrangular shape, and may be a circular or elliptical shape.

Figure 3:
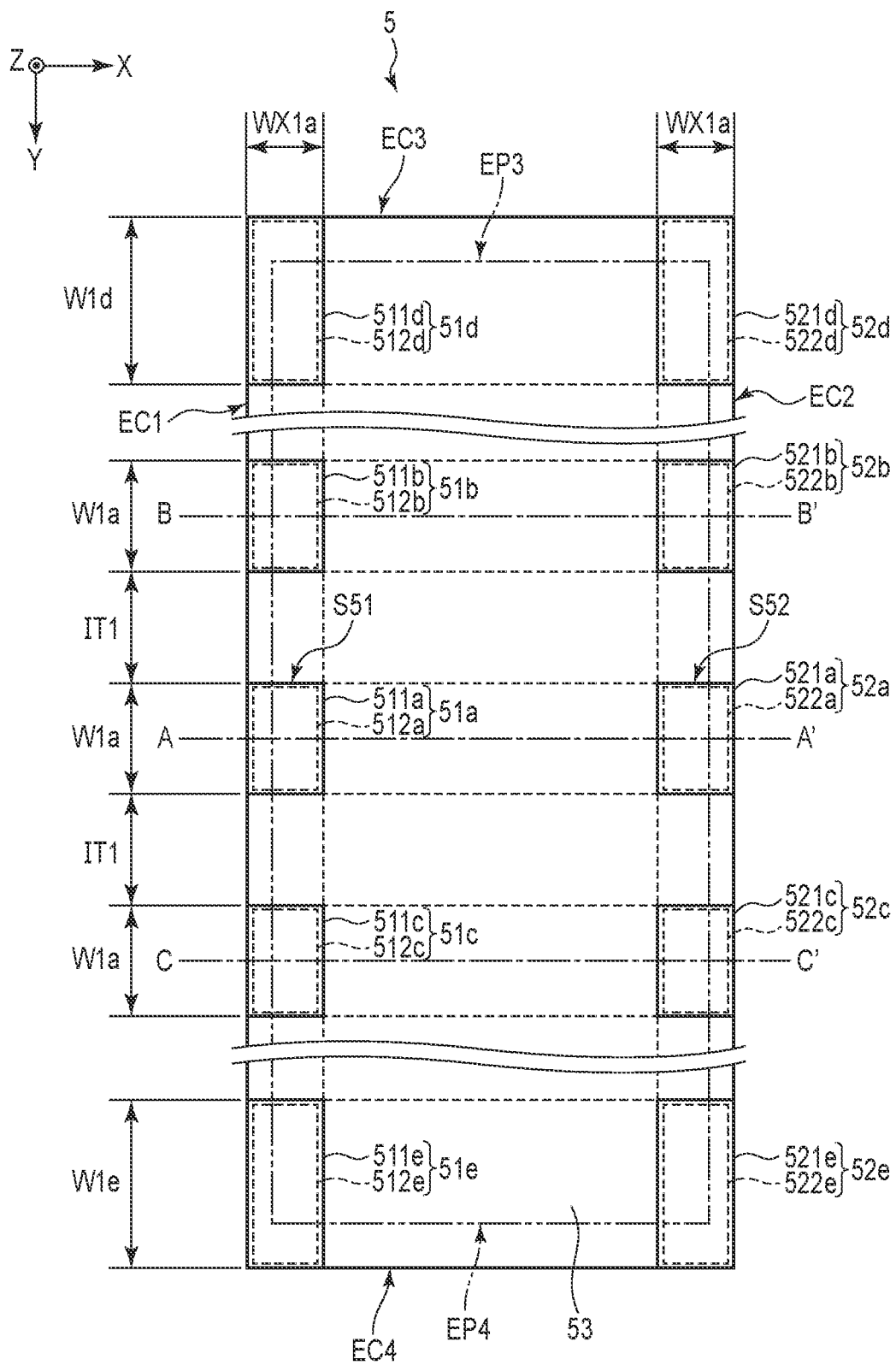
FIG. 3 is a plan view schematically showing the casing 5 shown in FIG. 1.

FIG. 3 is a plan view schematically showing the casing 5 shown in FIG. 1. The casing 5 has a substantially rectangular shape in planar view, and includes an edge part (first edge part) EC1, an edge part (second edge part) EC2, an edge part (third edge part) EC3, and an edge part EC4. The edge parts EC1 and EC2 are aligned along the first direction X and extend along the second direction Y. The edge parts EC3 and EC4 are arranged between the edge part EC1 and the edge part EC2 along the second direction Y and extend along the first direction X. A length of the edge parts EC1 and EC2 is larger than a length of the edge parts EC3 and EC4. In the example illustrated, the edge parts EC1, EC2, EC3, and EC4 correspond to the edge parts of the bottom portion 53.

The locking portions 51 (51a, 51b, 51c, 51d, and 51e) are provided at the edge part EC1 and are arranged along the second direction Y with intervals IT1. The locking portion 51a is located at the center of the edge part EC1 in the second direction Y. The locking portion 51b is adjacent to the locking portion 51a and is closer to the edge part EC3 than the locking portion 51a. The locking portion 51c is adjacent to the locking portion 51a and is more separated from the edge part EC3 than the locking portion 51a. The locking portion 51d and the locking portion 51e are located at both ends of the edge part EC1. In the example illustrated, the locking portion 51d is located on the edge part EC3 side, and the locking portion 51e is located on the edge part EC4 side.

Each of the locking portions 51 (51a, 51b, 51c, 51d, and 51e) includes a flat plate-shaped lugs 511 (511a, 511b, 511c, 511d, and 511e) and 512 (512a, 512b, 512c, 512d, and 512e). The lug 511 is located directly above the lug 512. The lug 511 and the lug 512 have substantially the same size and the same shape and, in the example illustrated, a substantially rectangular shape. The lugs 511a, 511b, and 511c and the lugs 512a, 512b, and 512c have a width W1a along the second direction Y. The lug 511d and the lug 512d have a width W1d along the second direction Y. The lug 511e and the lug 512e have a width W1e along the second direction Y. Each of the width W1d and the width W1e is larger than the width W1a. In the example illustrated, the width W1d and the width W1e are equal to each other, but may be different. In contrast, the lugs 511a, 511b, 511c, 511d, and 511e and the lugs 512a, 512b, 512c, 512d, and 512e have the same width WX1a, in the first direction X.

The locking portions 52 (52a, 52b, 52c, 52d, and 52e) are provided at the edge part EC2 and are arranged along the second direction Y with the intervals IT1. The locking portion 52a is located at the center of the edge part EC2 in the second direction Y. The locking portion 52b is adjacent to the locking portion 52a and closer to the edge part EC3 than the locking portion 52a. The locking portion 52c is adjacent to the locking portion 52a and is more separated from the edge part EC3 than the locking portion 52a. The locking portion 52d and the locking portion 52e are located at both ends of the edge part EC2. In the example illustrated, the locking portion 52d is located on the edge part EC3 side, and the locking portion 52e is located on the edge part EC4 side.

Each of the locking portions 52 (52a, 52b, 52c, 52d, and 52e) includes flat plate-shaped lugs 521 (521a, 521b, 521c, 521d, and 521e) and 522 (522a, 522b, 522c, 522d, and 522e). The lug 521 is located directly above the lug 522. The lug 521 and the lug 522 are formed to have substantially the same size and the same shape and, in the example illustrated, a substantially rectangular shape. The lugs 521a, 521b, and 521c and the lugs 522a, 522b, and 522c have a width W1a along the second direction Y. The lug 521d and the lug 522d have a width W1d along the second direction Y. The lug 521e and the lug 522e have a width W1e along the second direction Y. In contrast, the lugs 521a, 521b, 521c, 521d, and 521e and the lugs 522a, 522b, 522c, 522d, and 522e have the same width WX1a, in the first direction X.

In the embodiment, the locking portions 51 and the locking portions 52 are opposed to each other along the first direction X. In other words, one locking portion 51 and the locking portion 52 opposed to the locking portion 51 are located equidistantly from the edge part EC3. More specifically, the distance between a side edge S51 on the edge part EC3 side of the lug 511 and the edge part EC3 is equal to the distance between a side edge S52 on the edge part EC3 side of the lug 521 and the edge part EC3.

The display panel 2 is slightly smaller than the casing 5, and all of which overlap the casing 5. In other words, the edge part (fourth edge part) EP3 of the display panel 2 is located on an inner side than the edge part EC3 and overlaps the lug (seventh lug) 511d and the lug 521d. The edge part EP4 of the display panel 2 is located on an inner side than the edge part EC4 and overlaps the lugs 511e and 521e.

FIG. 4 is a cross-sectional view taken along line A-A' shown in FIG. 3. FIG. 4 shows a surface parallel to the X-Z plane defined by the first direction X and the third direction Z.

The locking portion 51a includes a side wall 513a in addition to the lug (first lug) 511a and the lug (third lug) 512a. The side wall 513a extends from the bottom portion 53 along the third direction Z. The lugs 511a and 512a extend from the side wall 513a toward the locking portion 52 side. In the example illustrated, each of the lugs 511a and 512a extends along the first direction X.

The locking portion 52a includes a side wall 523a in addition to the lug (second lug) 521a and the lug (fourth lug) 522a. The side wall 523a extends from the bottom portion 53 along the third direction Z. The lugs 521a and 522a extend from the side wall 523a toward the locking portion 51 side. In the example illustrated, each of the lugs 521a and 522a extends along the first direction X.

The lugs 511a and 521a are located equidistantly from the bottom portion 53, and the lugs 512a and 522a are located equidistantly from the bottom portion 53. In other words, the heights of the lugs 511a and the lugs 521a are equal to each other, and the heights of the lugs 512a and the lugs 522a are equal to each other. The display panel 2 and the optical sheets 6a, 6b, and 6c are located between the lug 511a and the lug 512a and between the lug 521a and the lug 522a, in the third direction Z. In the example illustrated, the optical sheet 6 is in contact with the lugs 512a and 522a. In contrast, the display panel 2 is separated from the lugs 511a and 521a. The illumination device 4 is located between the lug 512a and the bottom portion 53 and between the lug 522a and the bottom portion 53, in the third direction Z. In the example illustrated, the circuit board 41 of the illumination device 4 is in contact with the bottom portion 53.

The display device 1 includes a first adhesive member 71 (71a and 71b) and a second adhesive member 72 (72a and 72b) for adhering the display panel 2, the illumination device 4, and the casing 5. The first adhesive member 71 and the second adhesive member 72 are, for example, adhesive materials formed of resins such as epoxy, polyimide, and acrylic.

The first adhesive member 71 is provided on the edge part EC1 side. The first adhesive member 71a adheres the display panel 2 and the optical sheet 6 to the locking portion 51a. In the example illustrated, the first adhesive member 71a is provided between the side wall 513a and the display panel 2 and between the side wall 513a and the optical sheet 6 and is in contact with both members. The first adhesive member 71b adheres the illumination device 4 to the locking portion 51a. In the example illustrated, the first adhesive member 71b is provided between the side wall 513a and the circuit board 41 and between the side wall 513a and the light guide part 43, and is in contact with both members.

The second adhesive member 72 is provided on the edge part EC2 side. The second adhesive member 72a adheres the display panel 2 and the optical sheet 6 to the locking portion 52a. In the example illustrated, the second adhesive member 72a is provided between the side wall 523a and the display panel 2 and between the side wall 513a and the optical sheet 6 and is in contact with both members. The second adhesive member 72b adheres the illumination device 4 to the locking portion 52a. In the example illustrated, the second adhesive member 72b is provided between the side wall 523a and the circuit board 41 and between the side wall 523a and the light guide part 43, and is in contact with both.

Figure 5:
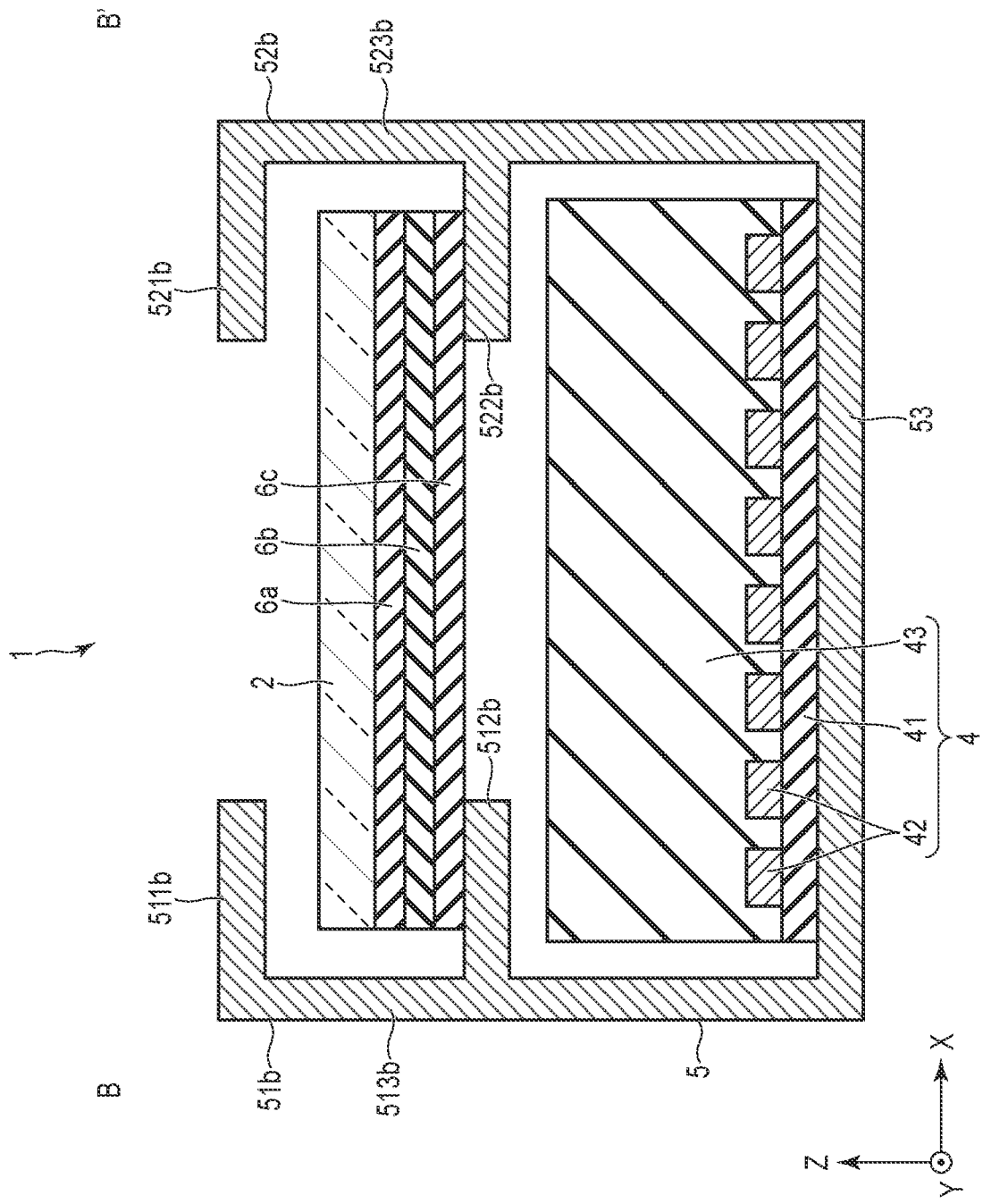
FIG. 5 is a cross-sectional view taken along line B-B' shown in FIG. 3.

FIG. 5 is a cross-sectional view taken along line B-B' shown in FIG. 3. As shown in FIG. 5, the adhesive member is not provided between the locking portion 51b and the display panel 2 or the illumination device 4, and between the locking portion 52b and the display panel 2 or the illumination device 4. In addition, although not shown, the cross-sectional view taken along line C-C' shown in FIG. 3 is the same as that in FIG. 5. In other words, the adhesive member is not provided between the locking portion 51c and the display panel 2 or the illumination device 4, and between the locking portion 52c and the display panel 2 or the illumination device 4.

Figure 6:
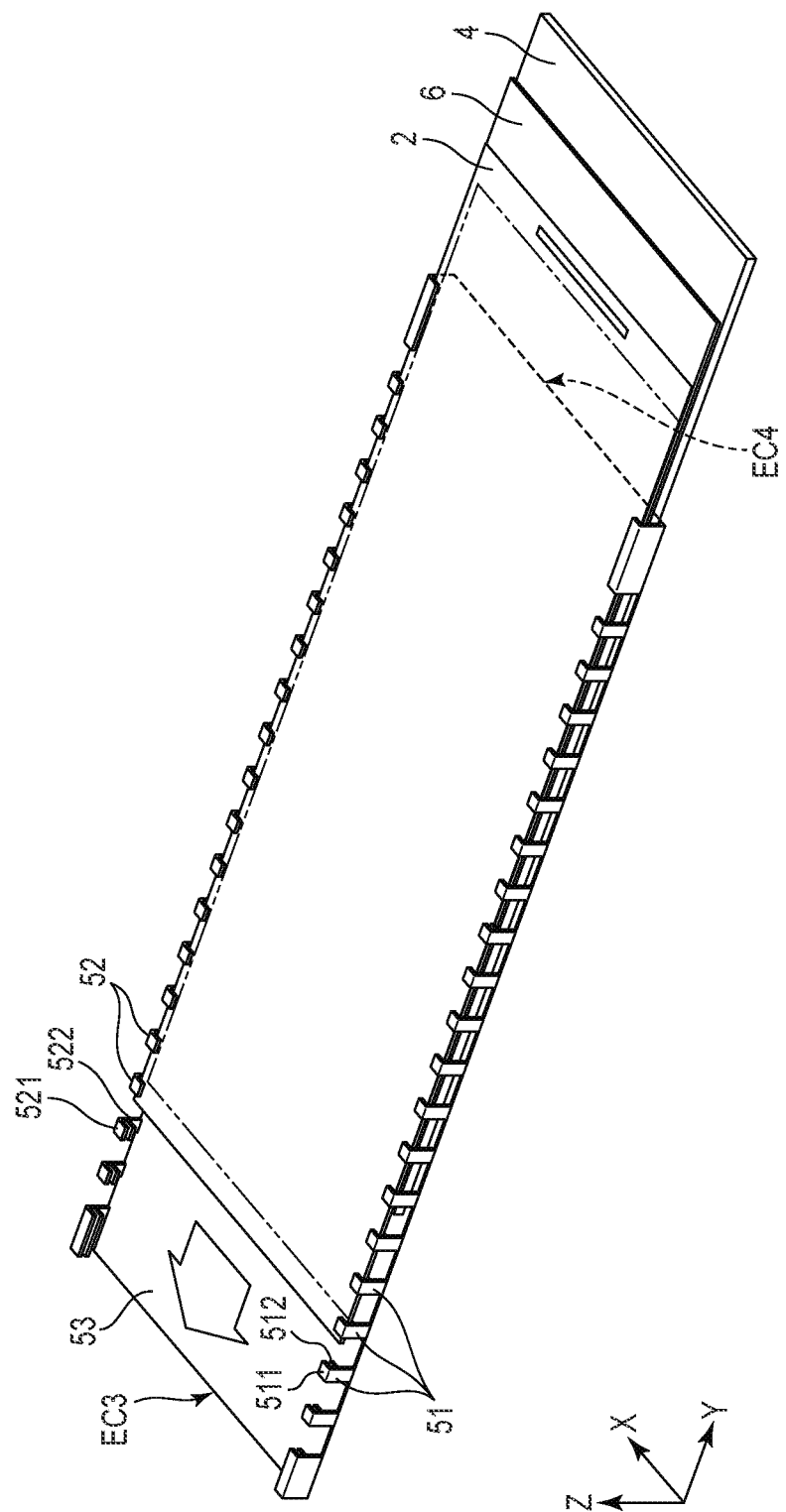
FIG. 6 is a view showing an example of a method of assembling the display device 1.

FIG. 6 is a view showing an example of a method of assembling the display device 1. Since the locking portion 51 is provided at the edge part EC1 and the locking portion 52 is provided at the edge part EC2, the display panel 2, the optical sheet 6, and the illumination device 4 are inserted from the edge part EC3 or EC4 side at which the locking portion is not provided. The example shown in FIG. 6 illustrates a situation in which the display panel 2, the optical sheet 6, and the illumination device 4 are inserted from the edge part EC4 side. The display panel 2 and the optical sheet 6 are inserted between the lug 511 and the lug 512 on the edge part EC1 side, and are inserted between the lug 521 and the lug 522 on the edge part EC2 side. The illumination device 4 is inserted between the lug 512 and the bottom portion 53 on the edge part EC1 side, and is inserted between the lug 522 and the bottom portion 53 on the edge part EC2 side. After that, as shown in FIG. 4, the display panel 2 and the illumination device 4 are adhered to the locking portion 51a by the first adhesive members 71a and 71b, and the display panel 2 and the illumination device 4 are adhered to the locking portion 52a by the second adhesive members 72a and 72b.

Figure 7A:
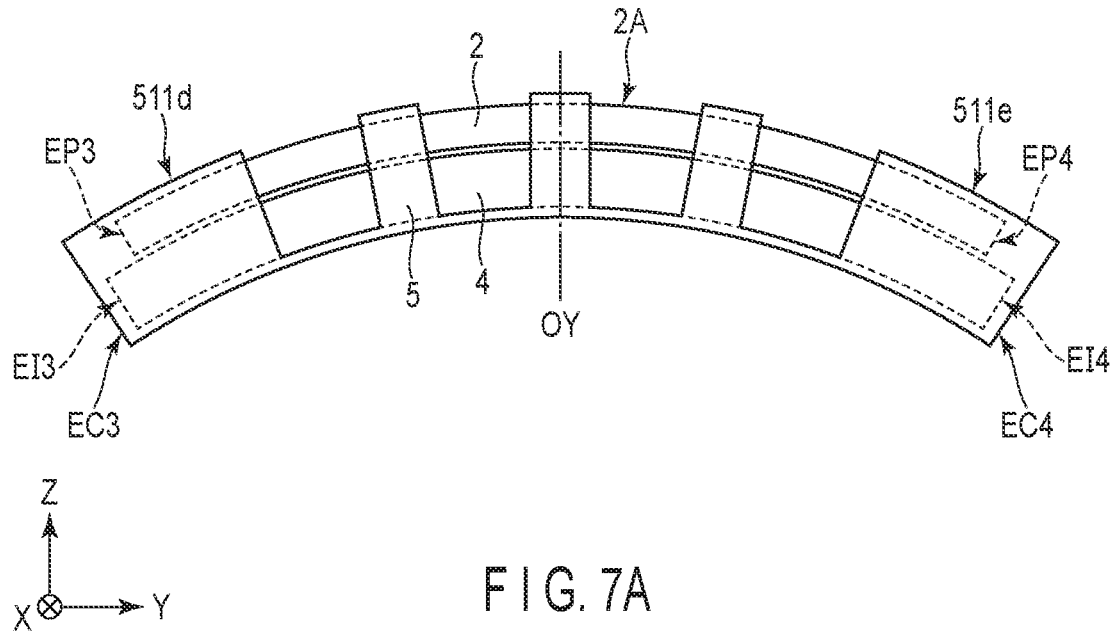
FIG. 7A is a side view showing a state in which the display device 1 is curved.
Figure 7B:
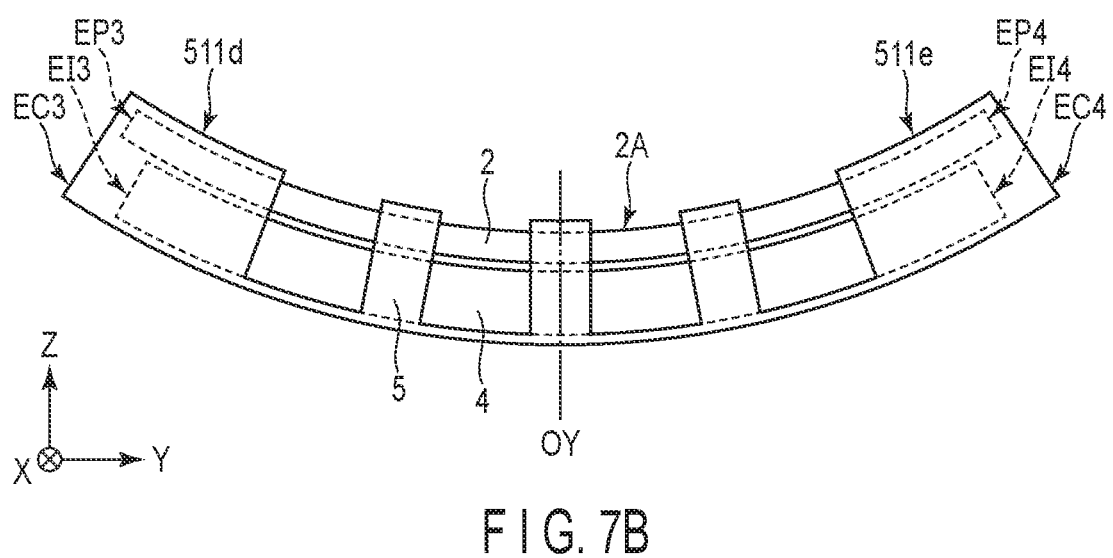
FIG. 7B is a side view showing a state in which the display device 1 is curved.

FIG. 7A and FIG. 7B are side views showing a state in which the display device 1 is curved. FIG. 7A and FIG. 7B show a plane parallel to the Y-Z plane defined by the second direction Y and the third direction Z. In the following descriptions, the end parts EI3 and EI4 of the circuit board 41 included in the illumination device 4 are referred to as end parts of the illumination device 4. In addition, the center position of the width along the second direction Y of the display device 1 is referred to as a center OY.

In the example shown in FIG. 7A, the display device 1 is curved such that the edge parts EP3 and EP4 of the display panel 2 are located below the upper surface 2A of the display panel 2 at the center OY. In other words, the display surface is a convex surface. In this case, the display panel 2 is located on the outer peripheral side of the curve, and the illumination device 4 is located on the inner peripheral side of the curve. Therefore, the effective length of the illumination device 4 located on the inner peripheral side is increased. As a result, the illumination device 4 extends to an outer side than the display panel 2. In other words, the edge parts EP3 and EP4 of the display panel 2 overlap the illumination device 4, but the edge parts EI3 and EI4 of the illumination device 4 do not overlap the display panel 2.

In the example shown in FIG. 7B, the display device 1 is curved such that the edge parts EP3 and EP4 of the display panel 2 are located on an upper side than the upper surface 2A of the display panel 2 at the center OY. In other words, the display surface is a concave surface. In this case, the display panel 2 is located on the inner peripheral side of the curve, and the illuminating device 4 is located on the outer peripheral side of the curve. Therefore, the effective length of the display panel 2 located on the inner peripheral side is increased. As a result, the display panel 2 extends to an outer side than the illumination device 4. In other words, the edge parts EP3 and EP4 of the display panel 2 do not overlap the illumination device 4, but the edge parts EI3 and EI4 of the illumination device 4 overlap the display panel 2.

In either case of FIG. 7A and FIG. 7B, the edge parts EC3 and EC4 of the casing 5 are located on a further outer side than the edge parts EP3, EI3, EP4, and EI4. Since the width W1d of the lug 511d and the width W1e of the lug 511e are sufficiently large as described above, the edge parts EP3, EI3, EP4, and EI4 are not exposed even when the display device 1 is curved. In other words, each of the edge parts EP3 and EI3 is covered with the lug 511d, on the edge part EC3 side. In addition, each of the edge parts EP3 and EI4 is covered with the lug 511e, on the edge part EC4 side.

According to the first embodiment, the display panel 2 and the illumination device 4 are adhered to the casing 5 by a pair of the first adhesive member 71 and the second adhesive member 72 arranged along the first direction X. More specifically, the display panel 2 is fixed to the locking portions 51a and 52a by the first adhesive member 71a and the second adhesive member 72a arranged along the first direction X, and the illumination device 4 is fixed to the locking portions 51a and 52a by the first adhesive member 71b and the second adhesive member 72b arranged along the first direction X. In other words, the display panel 2 and the illumination device 4 are fixed to the casing 5 at the locking portions 51a and 52a located equidistantly from the edge part EC3. In other words, the display panel 2 and the illumination device 4 are not fixed to the locking portions 51 other than the locking portion 51a (i.e., the locking portions 51b, 51c, 51d, and 51e), and the locking portions 52 other than the locking portion 52a (i.e., the locking portions 52b, 52c, 52d, and 52e). Therefore, when the display device 1 is curved, the display panel 2 and the illumination device 4 can be relatively displaced along the circumferential direction of the curve in a region other than the region where the locking portions 51a and 52a are provided.

In contrast, when the display panel 2 and the illumination device 4 are also fixed at positions other than the pair of locking portions 51a and 52a or when, for example, the display panel 2 and the illumination device 4 are fixed by an adhesive member arranged in a frame shape along the edge parts EP1, EP2, EP3, and EP4, the display panel 2 and the illuminating device 4 cannot be relatively displaced along the circumferential direction of the curve. Therefore, there is a risk that when the display device 1 is curved, the stress of the display device 1 cannot be relieved, and the display panel 2 and the illumination device 4 may be peeled off from the adhesive member.

According to the embodiment, however, since the positions of the edge part EP3 and the edge part EI3 can be displaced from each other and the positions of the edge part EP4 and the edge part EI4 can be displaced from each other, in accordance with the curvature of the display device 1, the stress of the display device 1 can be relieved when the display device 1 is curbed. As a result, peeling from the adhesive members of the display panel 2 and the illumination device 4 can be suppressed, and the structure of the display device 1 can be maintained even when deformation such as curbing occurs.

Furthermore, according to the first embodiment, the locking portion 51 includes the lugs 511 and 512 having different heights, and the locking portion 52 includes the lugs 521 and 522 having different heights, such that a space for accommodating the display panel 2 and a space for accommodating the illumination device 4 are formed in two layers. The display panel 2 is accommodated between the lug 511 and the lug 512, and between the lug 521 and the lug 522. The illumination device 4 is accommodated between the lug 512 and the bottom portion 53 and between the lug 522 and the bottom portion 53. The lugs 512 and 522 support the bottom surface of the display panel 2 and may be brought into contact with the upper surface of the illumination device 4 when the display device 1 is curved. The lugs 511 and 521 may be brought into contact with the upper surface of the display panel 2 when the display device 1 is curved. In other words, since the position of the display panel 2 is limited by the lugs 512 and 522 and the position of the illumination device 4 is limited by the lugs 511 and 521, the distance between the display panel 2 and the illumination device 4 can be kept constant even when the display device 1 is curved. The intensity of the light emitted from the illumination device 4 to the display panel 2 can be thereby kept constant regardless of whether the display device 1 is curved or not. As a result, unevenness in brightness in the display region DA can be suppressed and the display quality can be improved.

Next, another example of the first embodiment will be described with reference to FIG. 8A to FIG. 25.

Figure 8A:
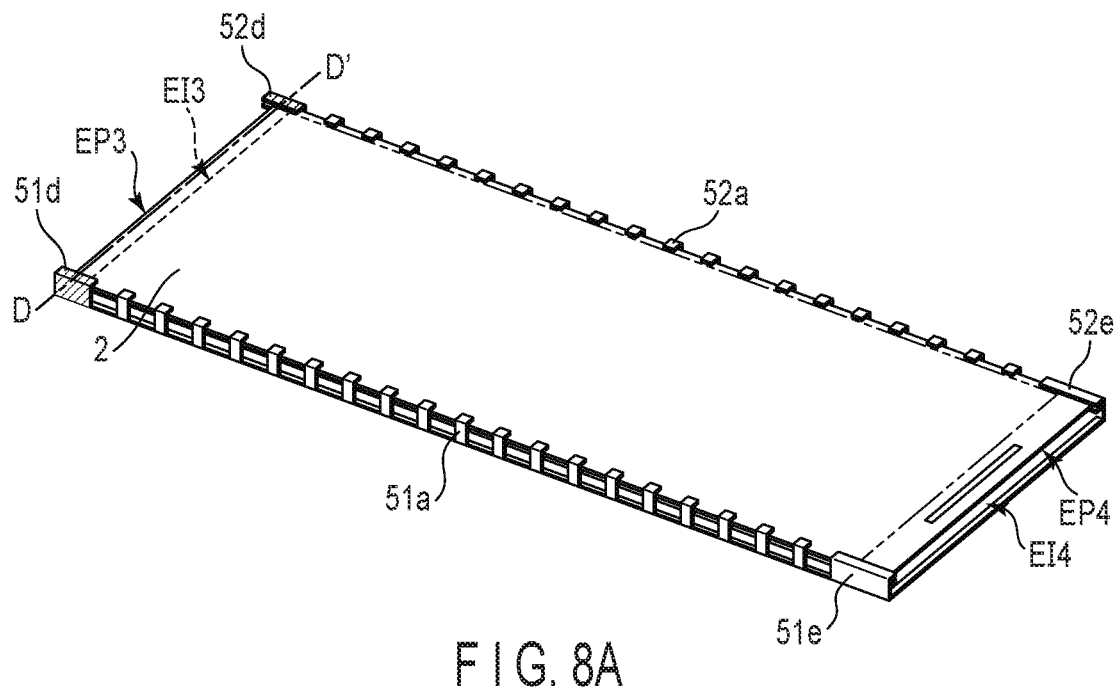
FIG. 8A is a perspective view showing another example of the display device 1.
Figure 8B:
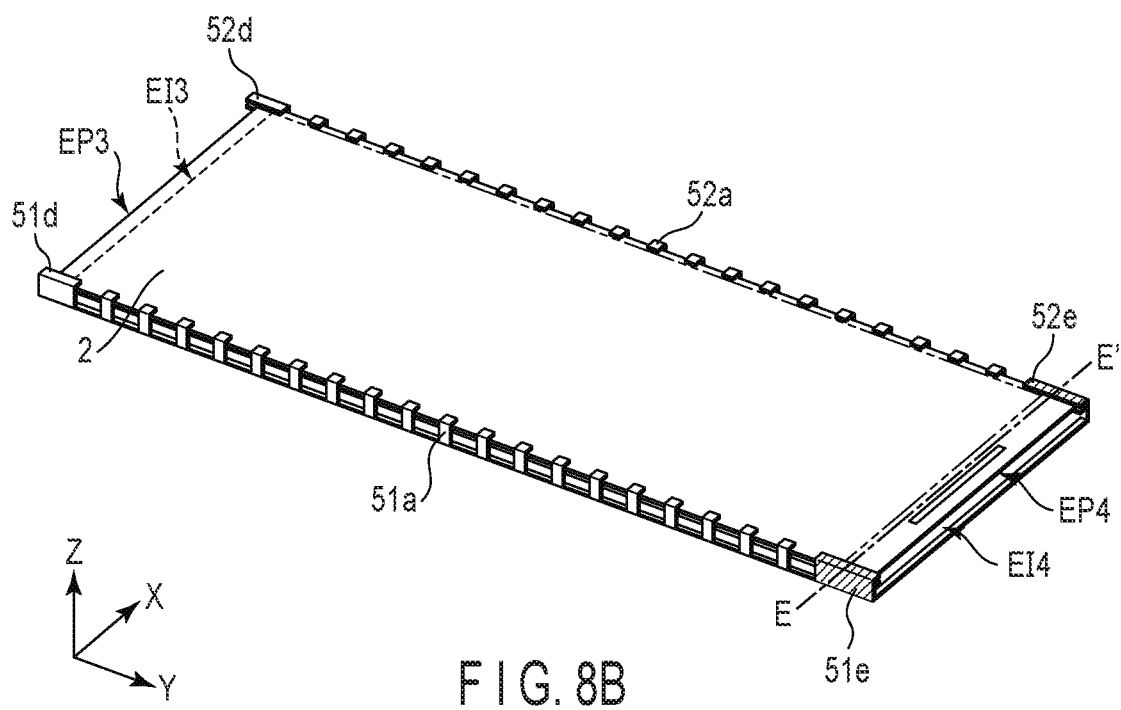
FIG. 8B is a perspective view showing another example of the display device 1.

FIG. 8A and FIG. 8B are perspective views showing another example of the display device 1. The example shown in FIG. 8A and FIG. 8B is different from the example shown in FIG. 1 in that the adhesive members are not provided on the locking portions 51a and 52a.

In the example shown in FIG. 8A, the adhesive members are provided not at a pair of locking portions 51d and 52d, i.e., central parts of the display device 1 in the second direction Y, but near edge parts, as represented by hatch lines in the figure. The cross-sectional view taken along line D-D' is similar to the example shown in FIG. 4. When the display device 1 is curved, the positions of the edge part EP3 and the edged part EI3 are not substantially changed. In contrast, the stress of the display device 1 is relaxed by relatively displacing the positions of the edge part EP4 and the edged part EI4. In the example shown in FIG. 8B, the adhesive members are provided on the pair of locking portions 51e and 52e, as represented by hatch lines in the figure. The cross-sectional view taken along line E-E' is similar to the example shown in FIG. 4. When the display device 1 is curved, the positions of the edge part EP4 and the edge part EI4 are not substantially changed. In contrast, the stress of the display device 1 is relaxed by relatively displacing the positions of the edge part EP3 and the edged part EI3. As described above, the same advantages as those of the example shown in FIG. 1 can also be obtained in the example shown in FIG. 8A and FIG. 8B.

FIG. 9 is a cross-sectional view showing the other example of the display panel 1. The example shown in FIG. 9 is different from the example shown in FIG. 4 in that the adhesive member is a double-sided tape. The first adhesive member 71a adheres the lug 511a and the display panel 2. The first adhesive member 71b adheres the illumination device 4 and the bottom portion 53. The second adhesive member 72a adheres the lug 521a and the display panel 2. The second adhesive member 72b adheres the illumination device 4 and the bottom portion 53.

In the example illustrated, double-sided tapes serving as adhesive members are also provided between the display panel 2 and the optical sheet 6, respectively. More specifically, the first adhesive member 71c and the second adhesive member 72c are provided between the display panel 2 and the optical sheet 6a, the first adhesive member 71d and the second adhesive member 72d are provided between the optical sheet 6a and the optical sheet 6b, and the first adhesive member 71e and the second adhesive member 72e are provided between the optical sheet 6b and the optical sheet 6c. No adhesive member is interposed between the optical sheet 6c and the lugs 512a and 522a. In other words, the optical sheet 6c is in contact with both the lugs 512a and 522a.

The first adhesive members 71a, 71b, 71c, 71d, and 71e overlap the lug 511a. The second adhesive members 72a, 72b, 72c, 72d, and 72e overlap the lug 521a. In the example shown in FIG. 9, too, the display panel 2 is fixed to the locking portions 51a and 52a by the first adhesive member 71a and the second adhesive member 72a. In addition, the illumination device 4 is fixed to the bottom portion 53 by the first adhesive member 71b and the second adhesive member 72b, at a position corresponding to the locking portions 51a and 52a, i.e., a position overlapping the lugs 511a and 521a. Therefore, the same advantages as those of the example shown in FIG. 4 can also be obtained in the example shown in FIG. 9.

Figure 10:
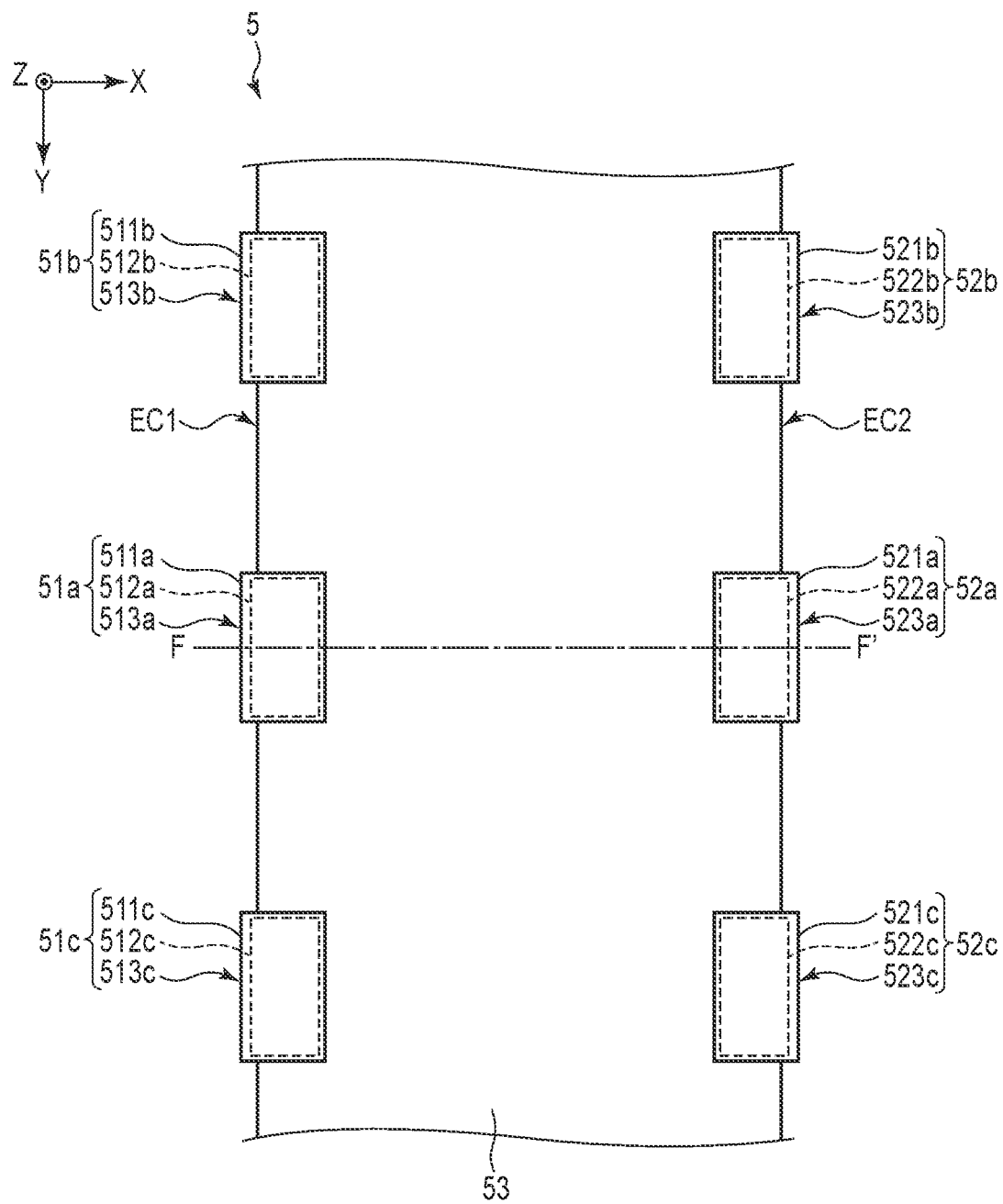
FIG. 10 is a plan view showing the other example of the casing 5.

FIG. 10 is a plan view showing the other example of the casing 5. The example shown in FIG. 10 is different from the example shown in FIG. 3 in that parts of the locking portions 51 and 52 do not overlap the bottom portion 53. More specifically, the side wall 513 of the locking portion 51 is located on an outer side than the edge part EC1, and the side wall 523 of the locking portion 52 is located on an outer side than the edge part EC2.

Figure 11:
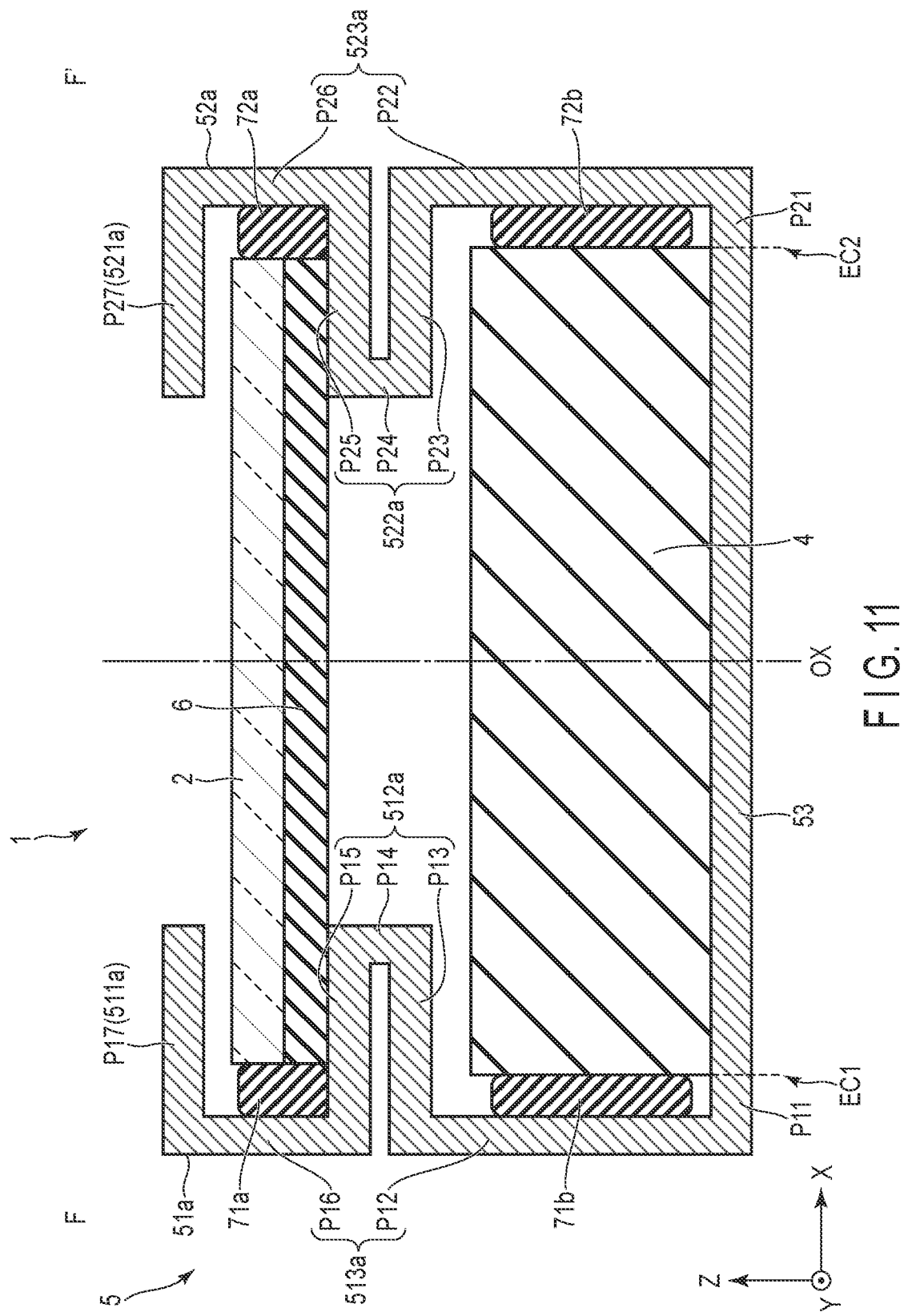
FIG. 11 is a cross-sectional view taken along line F-F' shown in FIG. 10.

FIG. 11 is a cross-sectional view taken along line F-F' shown in FIG. 10. Each of the locking portions 51a and 52a is bent. More specifically, the locking portion 51a includes portions P11, P12, P13, P14, P15, P16, and P17. The locking portion 52a includes portions P21, P22, P23, P24, P25, P26, and P27.

The portion P11 is flush with the bottom portion 53 and extends from the edge part EC1 along the first direction X. The portion P12 extends upward from the portion P11 along the third direction Z. The portion P13 extends from the portion P12 to the edge part EC2 side along the first direction X. The portion P15 extends along the first direction X at a position directly above the portion P13. The portion P14 extends along the third direction Z and connects the portion P13 and the portion P15. The portion P16 is located directly above the portion P12 and extends upward from the portion P15 along the third direction Z. The portion P17 extends along the first direction X at a position directly above the portion P15. In the example illustrated, lengths of the portions P13, P15, and P17 along the first direction X are equal to each other.

In this example, the portions P12 and P16 correspond to the side wall 513a of the locking portion 51a. The portions P13, P14, and P15 correspond to the lug 511a of the locking portion 51a. The portion P17 corresponds to the lug 512a of the locking portion 51a.

The portions P21, P22, P23, P24, P25, P26, and P27 of the locking portion 52a are arranged symmetrically with the portions P11, P12, P13, P14, P15, P16, and P17 of the locking portion 51a with respect to the central OX of the casing 5. The center OX is the center of the width of the casing 5 along the first direction X. The portions P22 and P26 therefore correspond to the side wall 523a of the locking portion 52a. The portions P23, P24, and P25 correspond to the lug 521a of the locking portion 52a. The portion P27 corresponds to the lug 522a of the locking portion 52a.

The locking portions 51 and 52 as described above can be formed by, for example, bending a sheet metal formed of aluminum. The display panel 2 and the optical sheet 6 are located between the portion P17 and the portion P15, and between the portion P27 and the portion P25. In the example illustrated, the optical sheet 6 is in contact with the portion P15 and the portion P25. The display panel 2 and the optical sheet 6 are adhered to the portions P16 and P15 by the first adhesive member 71a, and are adhered to the portions P26 and P25 by the second adhesive member 72a. The illumination device 4 is located between the portion P13 and the bottom portion 53, and between the portion P23 and the bottom portion 53. In the example illustrated, the illumination device 4 is in contact with the bottom portion 53. The illumination device 4 is adhered to the portion P12 by the first adhesive member 71b and is adhered to the portion P22 by the second adhesive member 72b. The same advantages as those of the example shown in FIG. 3 and FIG. 4 can also be obtained in the example shown in FIG. 10 and FIG. 11.

Figure 12:
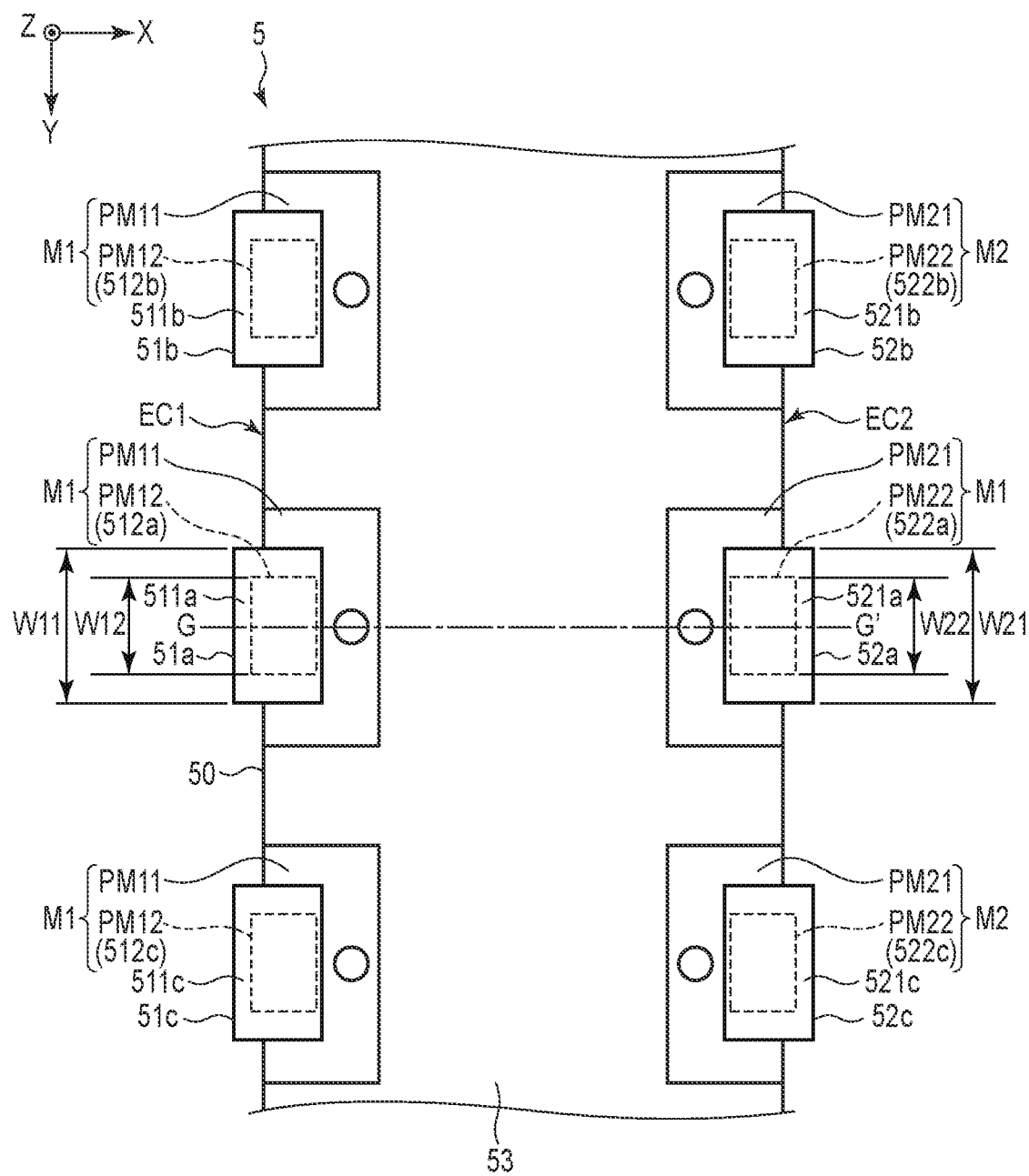
FIG. 12 is a plan view showing the other example of the casing 5.

FIG. 12 is a plan view showing the other example of the casing 5. The example shown in FIG. 12 is different from the example shown in FIG. 3 in that the casing 5 is formed of a plurality of members. More specifically, the casing 5 includes a base material 50 and members M1 and M2. The locking portion 51 is formed of the base material 50 and the member M1. The locking portion 52 is formed of the base material 50 and the member M2. The base material 50 constitutes the bottom portion 53, and also forms the lug 511 of the locking portion 51 and the lug 521 of the locking portion 52.

The members M1 are aligned along the second direction Y on the edge part EC1 side. The member M1 includes a portion PM11 and a portion PM12. In the illustrated example, the portion PM11 and the portion PM12 have a substantially rectangular shape. The portion PM11 is located on the bottom portion 53 and is arranged along the edge part EC1. In other words, an entire part of the portion PM11 overlaps the bottom portion 53, and its edge part extending along the second direction Y coincides with the edge part EC1. The portion PM12 is located directly below the lug 511 and forms the lug 512 of the locking portion 51. In the example illustrated, the portion PM12 extends on an outer side than the edge part EC1. In other words, the portion PM12 partially overlaps the bottom portion 53.

The members M2 are aligned along the second direction Y on the edge part EC2 side. The member M2 includes a portion PM21 and a portion PM22. In the example illustrated, the portion PM21 and the portion PM22 have a substantially rectangular shape. The portion PM21 is located on the bottom portion 53 and is arranged along the edge part EC1. In other words, an entire part of the portion PM21 overlaps the bottom portion 53, and its edge part extending along the second direction Y coincides with the edge part EC2. The portion PM22 is located directly below the lug 521 and forms the lug 522 of the locking portion 52. In the example illustrated, the portion PM22 extends on an outer side than the edge part EC2. In other words, the portion PM22 partially overlaps the bottom portion 53.

In the example illustrated, a width W11 of the lug 511 is larger than a width of the lug 512. In addition, a width W21 of the lug 521 is larger than a width W22 of the lug 522. The width refers to a width along the second direction Y. The width W11 and the width W21 are equal to each other, and the width W12 and the width W22 are equal to each other. Incidentally, the widths W11 and W21 may be equal to or less than the widths W12 and W22.

Figure 13:
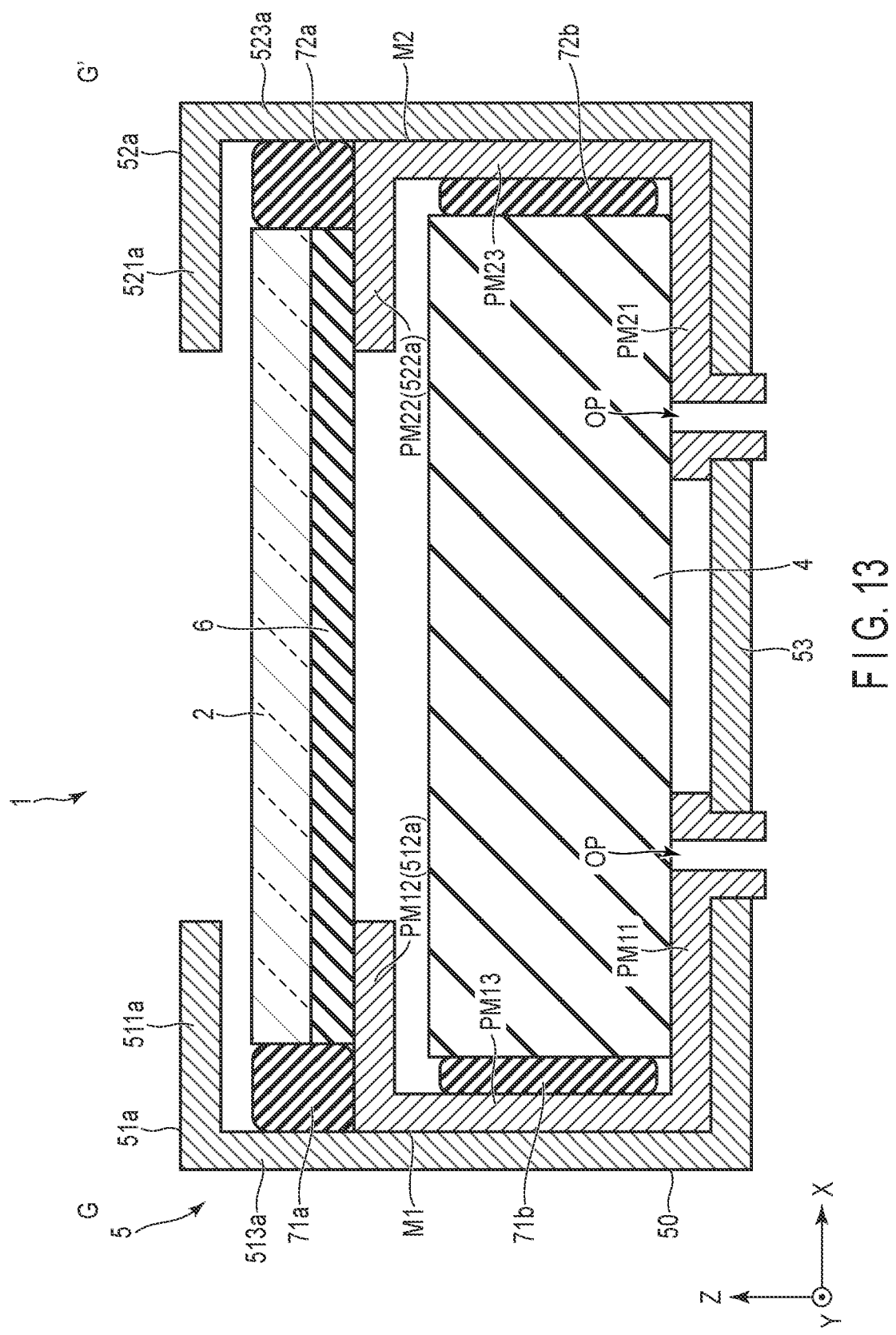
FIG. 13 is a cross-sectional view taken along line G-G' shown in FIG. 12.

FIG. 13 is a cross-sectional view taken along line G-G' shown in FIG. 12. The lug 511a, the side wall 513a, the bottom portion 53, the side wall 523a, and the lug 521a are integrally formed by the base material 50.

The member M1 is arranged closer to the locking portion 52a than the side wall 513a. The member M1 includes a portion PM13 in addition to the portions PM11 and PM12. The portion PM11 is arranged on the bottom portion 53 and is in contact with the bottom portion 53. The portion PM12 extends along the first direction X, at a position directly above the portion PM11. The portion PM13 extends along the third direction Z between the portion PM11 and the portion PM12, and is in contact with the side wall 513a. The portion PM12 is located between the lug 511a and the portion PM11 in the third direction Z, and forms the lug 512a.

The member M2 is arranged closer to the locking portion 51a than the side wall 523. The member M2 includes a portion PM23 in addition to the portions PM21 and PM22. The portion PM21 is arranged on the bottom portion 53 and is in contact with the bottom portion 53. The portion PM22 extends along the first direction X, at a position directly above the portion PM21. The portion PM23 extends along the third direction Z between the portion PM21 and the portion PM22, and is in contact with the side wall 523a. The portion PM22 is located between the lug 521a and the portion PM21 in the third direction Z, and forms the lug 522a.

The base material 50, the member M1, and the member M2 are formed by, for example, bending a sheet metal formed of aluminum. The member M1 and the base material 50, and the member M2 and the base material 50 are pressed by, for example, half punch. At this time, for example, openings OP are formed in the member M1 and the base material 50, and in the member M2 and the base material 50, respectively.

The display panel 2 and the optical sheet 6 are located between the lug 511a and the portion PM12, and between the lug 521a and the portion PM22. In the example illustrated, the optical sheet 6 is in contact with the portion P12 and the portion P22. The display panel 2 and the optical sheet 6 are adhered to the side wall 513a and the portion PM12 by the first adhesive member 71a, and are adhered to the side wall 523a and the portion PM22 by the second adhesive member 72a. The illumination device 4 is located between the portion PM12 and the portion PM11, and between the portion PM22 and the portion PM21. In the example illustrated, the illumination device 4 is in contact with the portion PM11 and the portion PM21, but is not in contact with the bottom portion 53. The illumination device 4 is adhered to the portion PM13 by the first adhesive member 71b and is adhered to the portion PM23 by the second adhesive member 72b. The same advantages as those of the example shown in FIG. 3 and FIG. 4 can also be obtained in the example shown in FIG. 12 and FIG. 13.

Figure 14:
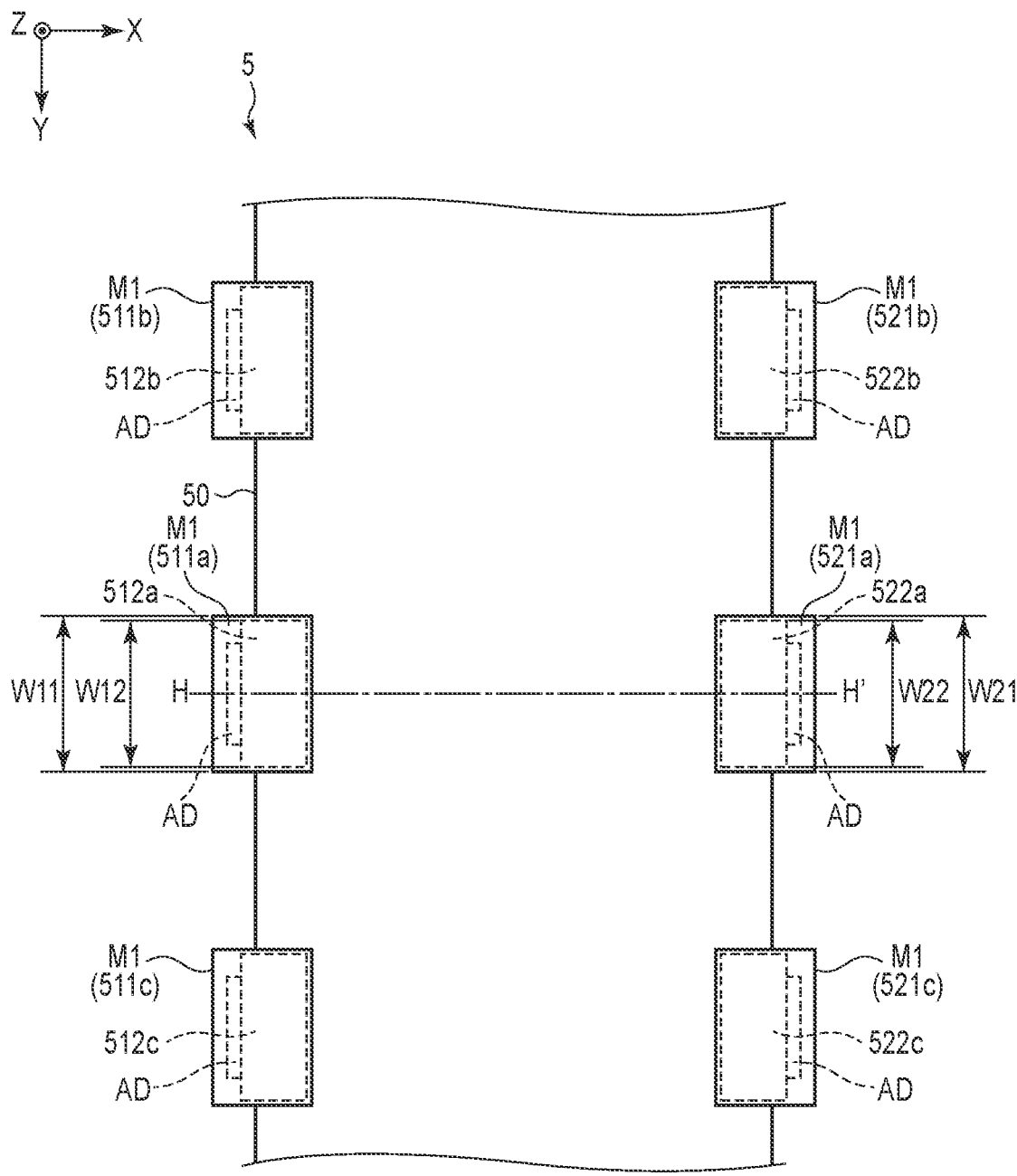
FIG. 14 is a plan view showing the other example of the casing 5.

FIG. 14 is a plan view showing the other example of the casing 5. The example shown in FIG. 14 is different from the example shown in FIG. 12 in that the members M1 and M2 are located above the base material 50. In other words, the member M1 forms the lug 511, and the member M2 forms the lug 521. In addition, the base material 50 forms the lugs 512 and 522. The member M1 and the base material 50, and the member M2 and the base material 50 are adhered to each other by the adhesive AD. In the example illustrated, the width W11 of the lug 511 and the width W12 of the lug 512 are substantially equal to each other, and the width W21 of the lug 521 and the width W22 of the lug 522 are substantially equal to each other. In addition, the width W11 and the width W21 are equal to each other. The widths W11, W12, W21, and W22 are the widths along the second direction Y. Incidentally, the width W11 and the width W12 may be different from each other, and the width W21 and the width W22 may be different from each other.

Figure 15:
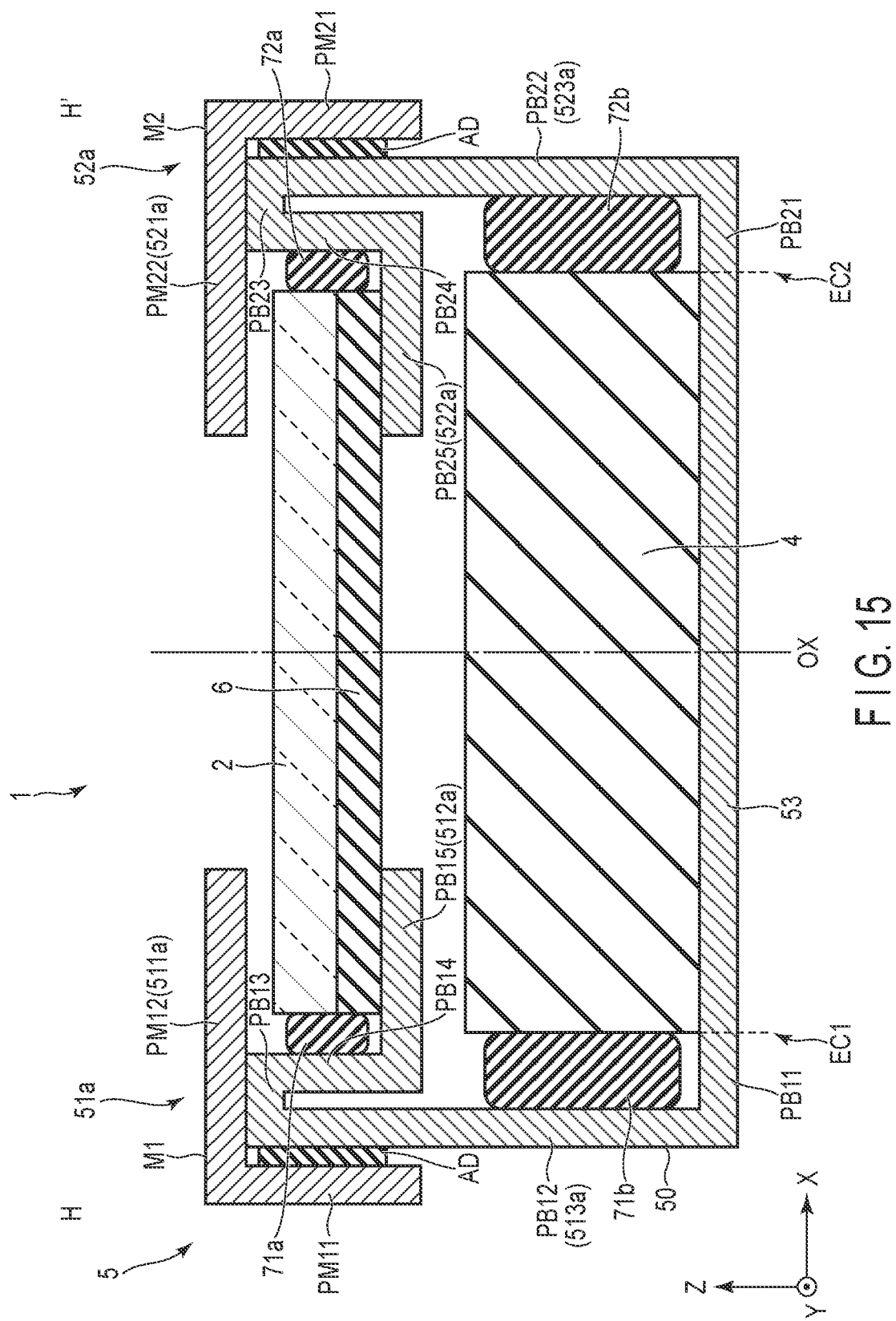
FIG. 15 is a cross-sectional view taken along line H-H' shown in FIG. 14.

FIG. 15 is a cross-sectional view taken along line H-H' shown in FIG. 14. The base material 50 includes portions PB11, PB12, PB13, PB14, and PB15 constituting the locking portion 51, and portions PB21, PB22, PB23, PB24, and PB25 constituting the locking portion 52.

The PB11 is located to be flush with the bottom portion 53 and extends on an outer side than the edge part EC1. The portion PB21 extends upward from the portion PB11 along the third direction Z. The portion PB13 extends from the portion PB2 to the edge part EC2 side along the first direction X. The portion PB14 extends downward from the portion PB13 along the third direction Z. The portion PB15 extends from the portion PB14 to the edge part EC2 side along the first direction X. The portion PB15 is located between the portion PB13 and the portion PB11 in the third direction Z. In other words, the length of the portion PB14 along the third direction Z is shorter than the length of the portion PB12 along the third direction Z, and the portion PB15 is located below the portion PB13. The portion PM15 corresponds to the lug 512a. The portion PB12 corresponds to the side wall 513a. The portion P13 functions as a support for supporting the member M1.

The member M1 is bent in a substantially L-letter shape and includes the portion PM11 and the portion PM12. The portion PM11 extends along the third direction Z and is opposed to the side wall 513a. In the example illustrated, the portion PM11 is arranged on an outer side than the side wall 513a (i.e., the side separated from the edge part EC2). The portion PM11 is adhered to the side wall 513a by the adhesive AD. The portion PM12 is arranged on the portion PB13 and extends along the first direction X. In the example illustrated, the portion PM12 is in contact with the portion PB13, but an adhesive or an adhesive tape may be interposed between the portion PM12 and the portion PB13. The portion PM12 corresponds to the lug 511a.

In the locking portion 52, the portions PB21, PB22, PB23, PB24, and PB25 are arranged symmetrically with PB11, PB12, PB13, PB14, and PB15 with respect to the center OX of the casing 5. In other words, the portion PM25 corresponds to the lug 522a. The portion PB22 corresponds to the side wall 523a. In addition, the member M2 is bent in a substantially L-letter shape and includes the portion PM21 and the portion PM22. The member M2 is arranged symmetrically with the member M1 with respect to the center OX. In other words, the portion M21 extends along the third direction Z and is adhered to the side wall 523a by the adhesive AD. The portion PM22 extends along the first direction X and is arranged on the portion PB23. The portion PM22 corresponds to the lug 521a.

The base material 50, the member M1, and the member M2 are formed by, for example, bending a sheet metal formed of aluminum. The display panel 2 and the optical sheet 6 are located between the portion PM12 and the portion PB15, and between the portion PM22 and the portion PB25. In the example illustrated, the optical sheet 6 is in contact with the portion P15 and the portion P25. The display panel 2 and the optical sheet 6 are adhered to the portion PB14 by the first adhesive member 71a and is adhered to the portion PB24 by the second adhesive member 72a. The illumination device 4 is located between the portion PB15 and the bottom portion 53, and between the portion PB25 and the bottom portion 53. In the example illustrated, the illumination device 4 is in contact with the bottom portion 53. The illumination device 4 is adhered to the portion PB12 by the first adhesive member 71b and is adhered to the portion PB22 by the second adhesive member 72b. The same advantages as those of the example shown in FIG. 3 and FIG. 4 can also be obtained in the example shown in FIG. 14 and FIG. 15.

Figure 16:
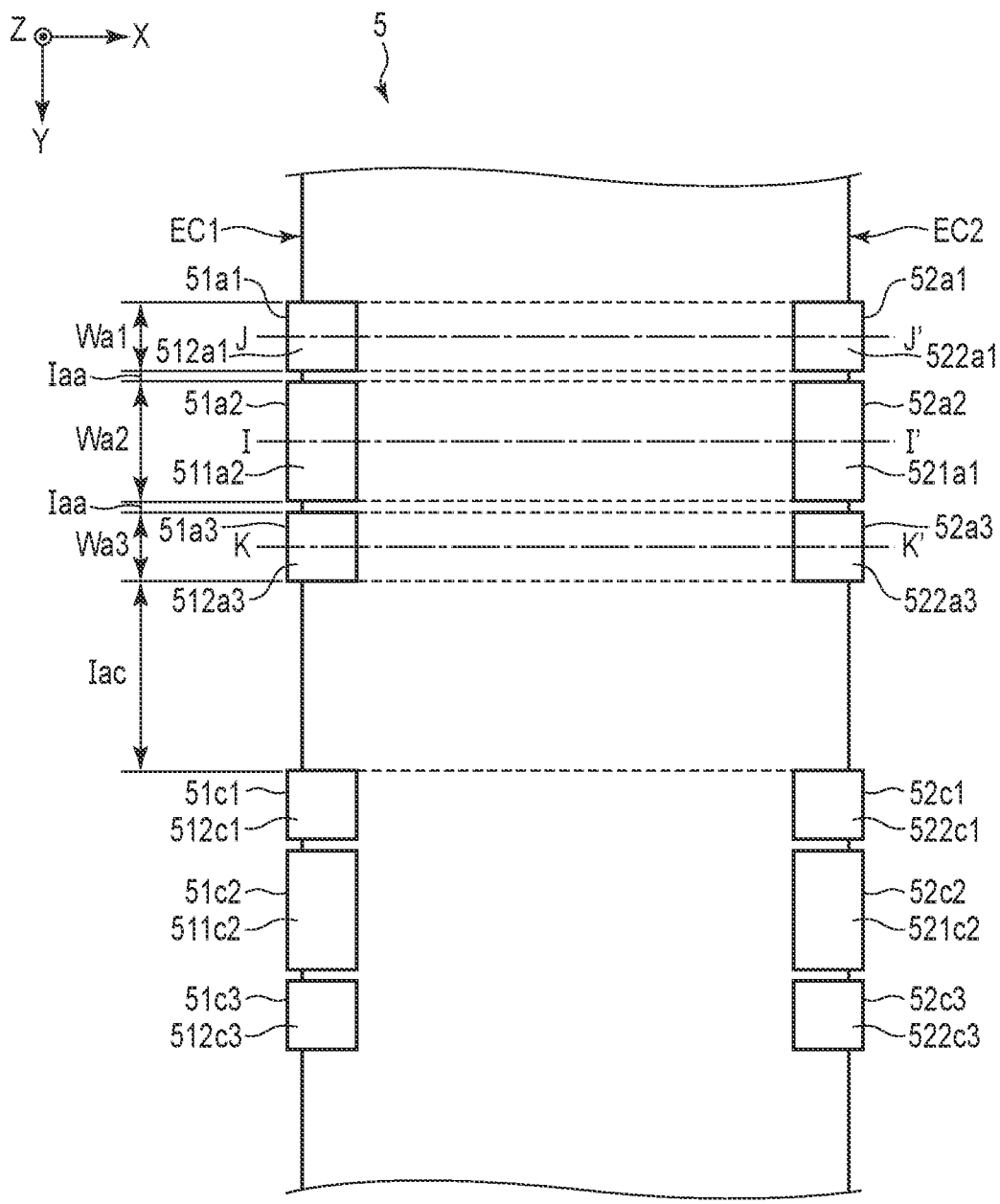
FIG. 16 is a plan view showing the other example of the casing 5.

FIG. 16 is a plan view showing the other example of the casing 5. The example shown in FIG. 16 is different from the example shown in FIG. 3 in that the two lugs do not overlap. In other words, the lug 511 and the lug 512 are different in position of the second direction Y, at the edge part EC1, and the lug 521 and the lug 522 are different in position of the second direction Y, at the edge part EC2.

At the edge part EC1, the casing 5 includes locking portions 51a1, 51a2, 51a3, 51c1, 51c2, and 51c3. The locking portions 51a1, 51a2, 51a3, 51c1, 51c2, and 51c3 are arranged in this order along the second direction Y. The locking portion 51a1 includes a lug 512a1, the locking portion 51a2 includes a lug 511a2, and the locking portion 51a3 includes a lug 512a3. The locking portions 51a1, 51a2, and 51a3 function as, for example, the locking portion 51a shown in FIG. 3. The locking portion 51c1 includes a lug 512c1, the locking portion 51c2 includes a lug 511c2, and the locking portion 51c3 includes a lug 512c3. The locking portions 51c1, 51c2, and 51c3 function as, for example, the locking portion 51a shown in FIG. 3.

In the example illustrated, a width Wa2 of the lug 511a2 is larger than a width Wa1 of the lug 512a1 and a width Wa3 of the lug 512a3. In addition, the width Wa1 and the width Wa3 are equal to each other. The locking portions 51a1, 51a2, and 51a3 are arranged at intervals Iaa. In contrast, the locking portion 51a3 and the locking portion 51c1 are arranged with an interval Iac larger than the interval Iaa. Each of the widths Wa1, Wa2, and Wa3 and the intervals Iaa and Iac is defined along the second direction Y.

At the edge part EC2, the casing 5 includes locking portions 52a1, 52a2, 52a3, 52c1, 52c2, and 52c3. The locking portions 52a1, 52a2, 52a3, 52c1, 52c2, and 52c3 are arranged in this order along the second direction Y. The locking portion 52a1 includes a lug 522a1, the locking portion 52a2 includes a lug 521a2, and the locking portion 52a3 includes a lug 522a3. The locking portions 52a1, 52a2, and 52a3 function as, for example, the locking portion 52a shown in FIG. 3. In addition, the locking portion 52c1 includes a lug 522c1, the locking portion 52c2 includes a lug 521c2, and the locking portion 52c3 includes a lug 522c3. The locking portions 52c1, 52c2, and 52c3 function as, for example, the locking portion 52a shown in FIG. 3.

The lug 522a1 has a width Wa1. The lug 521a2 has a width Wa2. The lug 522a3 has a width Wa3. In addition, the locking portions 52a1, 52a2, and 52a3 are arranged at the intervals Iaa. In contrast, the locking portion 52a3 and the locking portion 52c1 are arranged with the interval Iac.

The locking portions 51a1, 51a2, and 51a3 are opposed to the locking portions 52a1, 52a2, and 52a2, respectively, along the first direction X. In other words, the locking portion 51a1 and the locking portion 52a1 are located equidistantly from the edge part EC3, the locking portion 51a2 and the locking portion 52a2 are located equidistantly from the edge part EC3, and the locking portion 51a3 and the locking portion 52a3 are located equidistantly from the edge part EC3.

Figure 17:
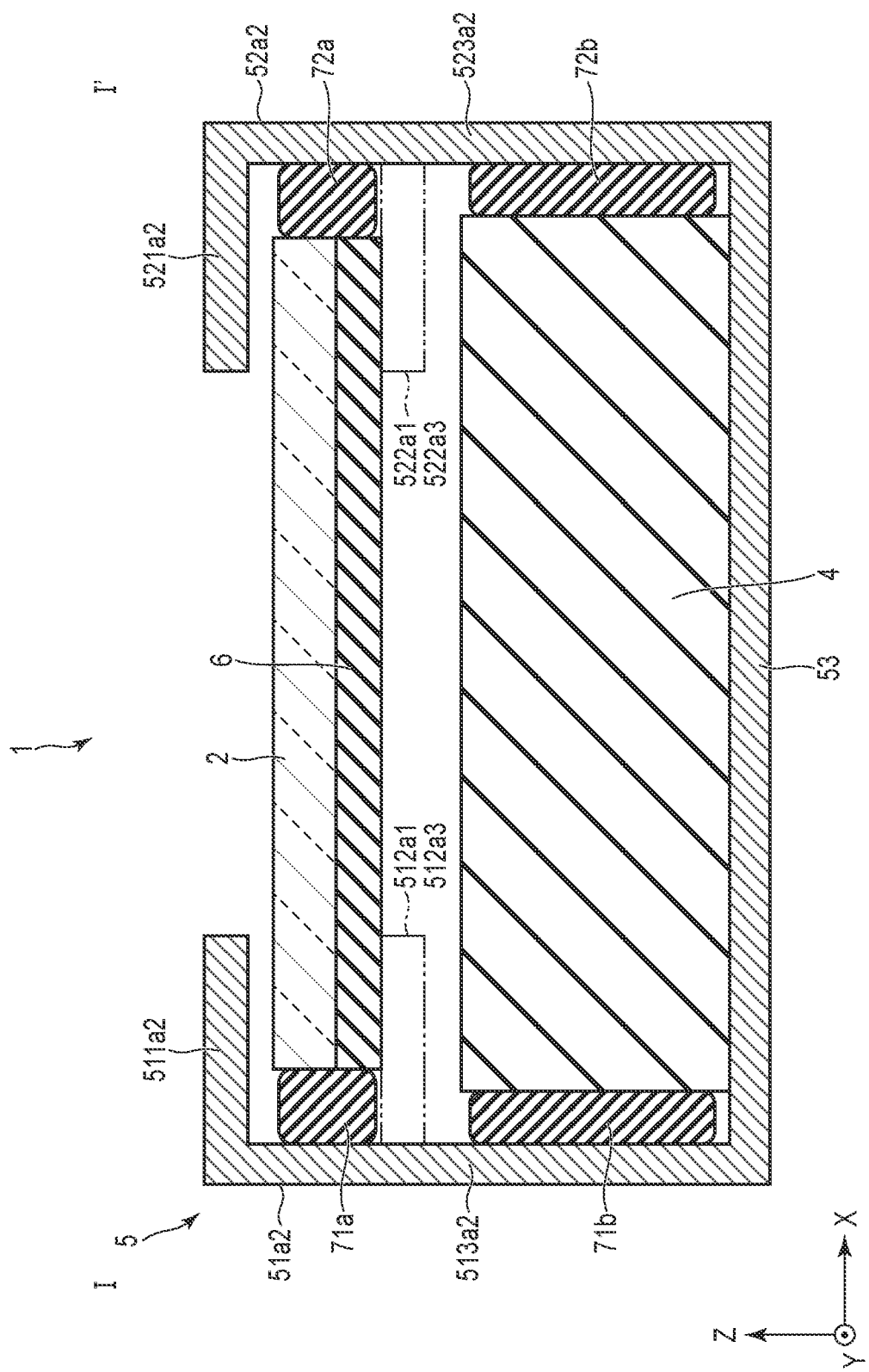
FIG. 17 is a cross-sectional view taken along line I-I' shown in FIG. 16.

FIG. 17 is a cross-sectional view taken along line I-I' shown in FIG. 16. The locking portion 51a2 includes a side wall 513a2 in addition to the lug 511a2. The side wall 513a2 extends along the third direction Z at a position between the lug 511a2 and the bottom portion 53. The locking portion 52a2 includes a side wall 523a2 in addition to the lug 521a2. The side wall 523a2 extends along the third direction Z at a position between the lug 521a2 and the bottom portion 53. The lug 511a2 and the lug 521a2 are located equidistantly from the bottom portion 53. For example, the lugs 511a2 and 521a2 are located above the lug 512a1 included in the locking portion 51a1, the lug 512a3 included in the locking portion 51a3, the lug 522a1 included in the locking portion 52a1, and the lug 522a3 included in the locking portion 52a3.

The display panel 2 and the illumination device 4 are located between the lugs 511a2 and 521a2 and the bottom portion 53. The display panel 2 and the optical sheet 6 are adhered to the side wall 513a2 by the first adhesive member 71a and is adhered to the side wall 523a2 by the second adhesive member 72a. The illumination device 4 is adhered to the side wall 513a2 by the first adhesive member 71b and is adhered to the side wall 523a2 by the second adhesive member 72b. Incidentally, the first adhesive member 71a and the first adhesive member 71b may be integrated, and the second adhesive member 72a and the second adhesive member 72b may be integrated.

Figure 18:
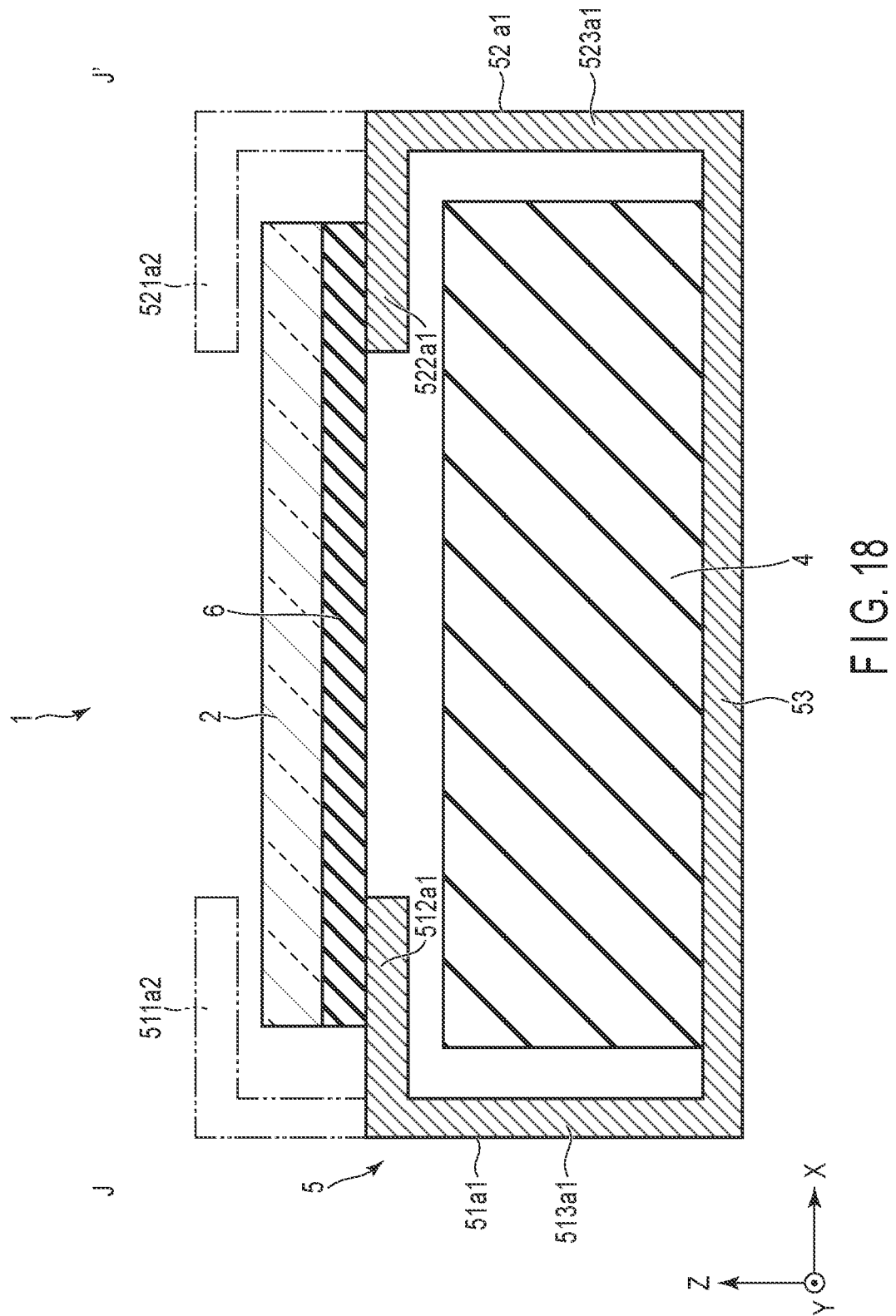
FIG. 18 is a cross-sectional view taken along line J-J' shown in FIG. 16.

FIG. 18 is a cross-sectional view taken along line J-J' shown in FIG. 16. The locking portion 51a1 includes a side wall 513a1 in addition to the lug 512a1. The side wall 513a1 extends along the third direction Z at a position between the lug 512a1 and the bottom portion 53. The locking portion 52a1 includes a side wall 523a1 in addition to the lug 522a1.

The side wall 523a1 extends along the third direction Z at a position between the lug 522a1 and the bottom portion 53.

The display panel 2 and the optical sheet 6 are arranged on the lugs 512a1 and 522a1. In other words, the lugs 512a1 and 522a1 are located on opposite sides to the lug 511a2 of the locking portion 51a2 and the lug 521a2 of the locking portion 52a2 with the display panel 2 and the optical sheet 6 sandwiched therebetween. In the example illustrated, the optical sheet 6 is in contact with the lugs 512a1 and 522a1. In the example shown in FIG. 18, no adhesive member is interposed between the locking portion 51a1 and the illumination device 4 or between the locking portion 52a1 and the illumination device 4. In addition, no adhesive member is interposed between the optical sheet 6 and the lug 512a1 or between the optical sheet 6 and the lug 522a1, either. Although not shown, the cross-sectional view taken along line K-K' shown in FIG. 16 is the same as the example shown in FIG. 18.

Incidentally, in the examples shown in FIG. 16 to FIG. 18, the locking portion 51a2 corresponds to a first locking portion, the locking portion 52a2 corresponds to a second locking portion, the locking portion 51a1 corresponds to a third locking portion, and the locking portion 52a1 corresponds to a fourth locking portion. In addition, the lug 511a2 corresponds to the first lug, the lug 521a2 corresponds to the second lug, the lug 512a1 corresponds to the fifth lug, and the lug 522a1 corresponds to the sixth lug. The same advantages as those of the example shown in FIG. 3 and FIG. 4 can also be obtained in the example shown in FIG. 16 to FIG. 18.

Figure 19:
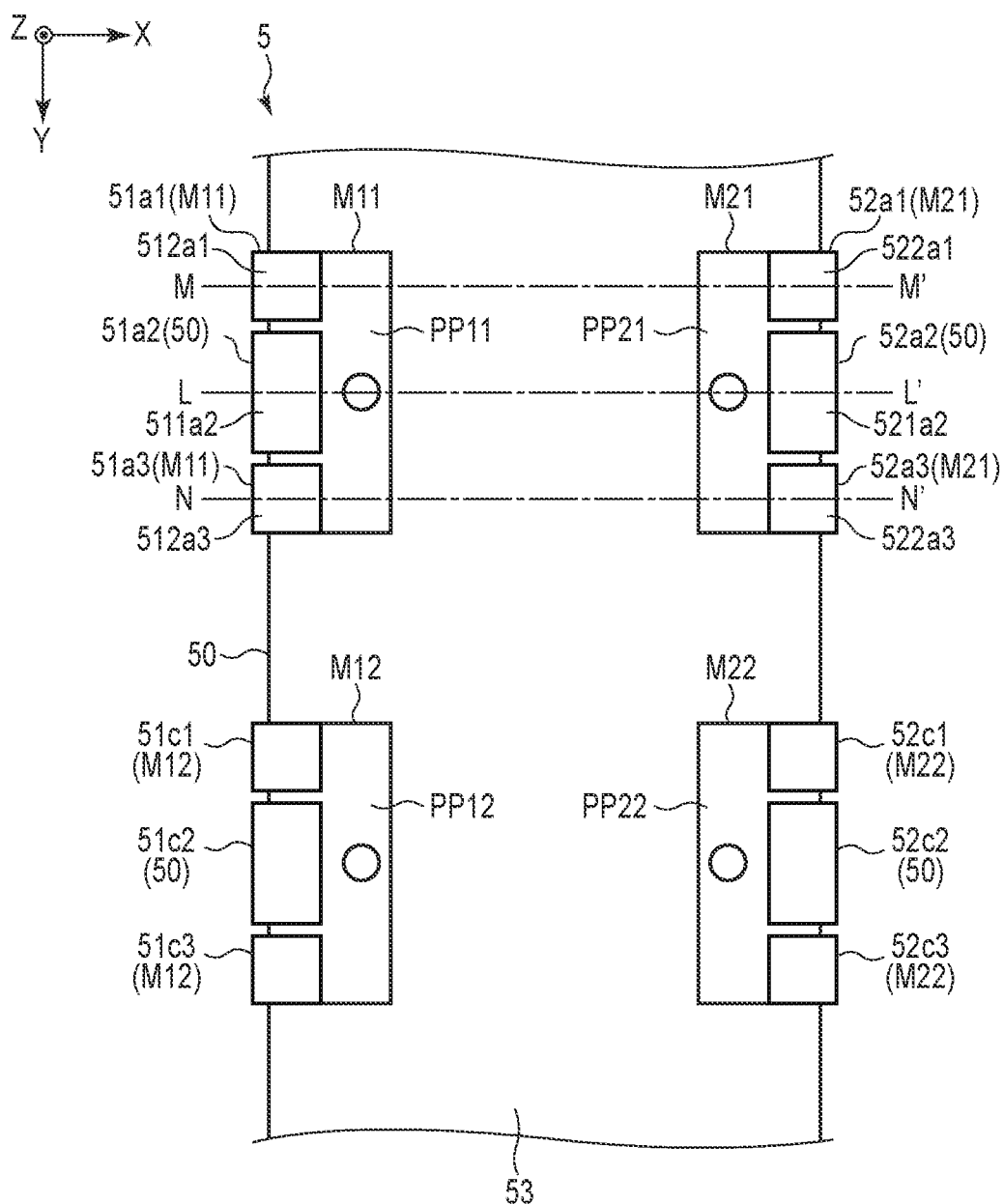
FIG. 19 is a plan view showing the other example of the casing 5.

FIG. 19 is a plan view showing the other example of the casing 5. The example shown in FIG. 19 is different from the example shown in FIG. 16 in that the casing 5 is formed of a plurality of members. In other words, the casing 5 comprises the base material 50 and members M11, M12, M21, and M22. The bottom portion 53, the locking portion 51a2, the locking portion 52a2, the locking portion 51c2, and the locking portion 52c2 are formed of the base material 50. The locking portion 51a1 and the locking portion 51a3 are formed of the member M11. The locking portion 51c1 and the locking portion 51c3 are formed of the member M12. The locking portion 52a1 and the locking portion 52a3 are formed of the member M21. The locking portion 52c1 and the locking portion 52c3 are formed of the member M22.

The member M11 includes a portion PP11 in addition to the locking portions 51a1 and 51a3. The portion PP11 has a substantially rectangular shape and overlaps the lug 512a1 of the locking portion 51a1, the lug 511a2 of the locking portion 51a2, and the lug 512a3 of the locking portion 51a3. The locking portions 51a1, 51a2, and 51a3 arranged along the second direction Y function as the locking portion 51a shown in FIG. 3. Incidentally, although description is omitted, the member M12 is constituted in the same manner.

The portion M21 includes a portion PP21 in addition to the locking portions 52a1 and 52a3. The portion PP21 has a substantially rectangular shape and overlaps the lug 522a1 of the locking portion 52a1, the lug 521a2 of the locking portion 52a2, and the lug 522a3 of the locking portion 52a3. The locking portions 52a1, 52a2, and 52a3 arranged along the second direction Y function as the locking portion 52a shown in FIG. 3. Incidentally, although description is omitted, the member M22 is constituted in the same manner.

Figure 20:
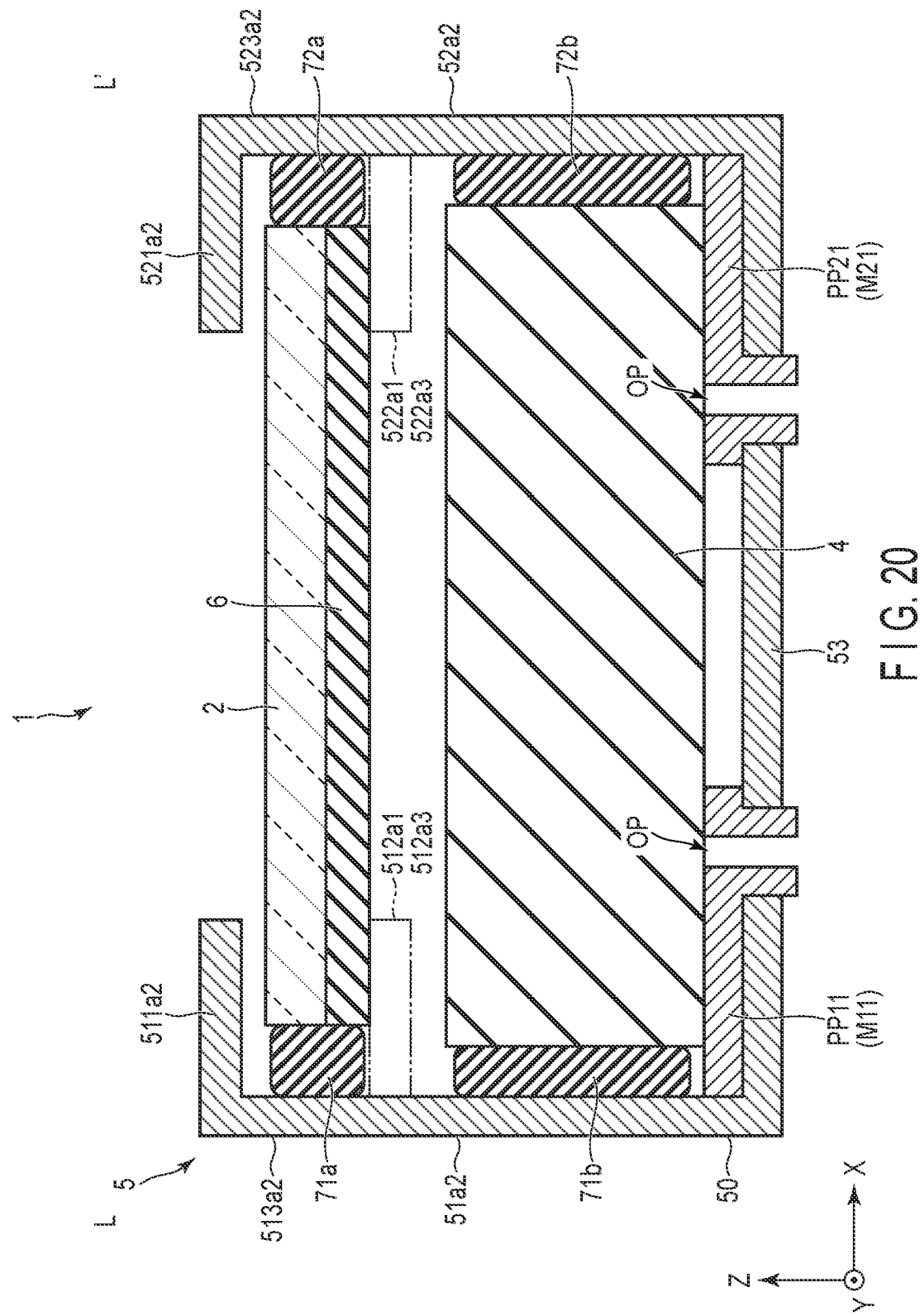
FIG. 20 is a cross-sectional view taken along line L-L' shown in FIG. 19.

FIG. 20 is a cross-sectional view taken along line L-L' shown in FIG. 19. The member M11 and the member M21 are arranged on the bottom portion 53. More specifically, the portion PP11 and the portion PP21 are in contact with the bottom portion 53. The illuminating device 4 is arranged on the portion PP11 and the portion PP21 and is in contact with both of them, but is not in contact with the bottom portion 53. The member M11 and the base material 50, and the member M21 and the base material 50 are pressed by, for example, half punch. At this time, for example, openings OP are formed in the portion PP11 and the base material 50, and in the portion PP 21 and the base material 50, respectively. Description of the other constituent elements is omitted since they are the same as those of the example shown in FIG. 17.

Figure 21:
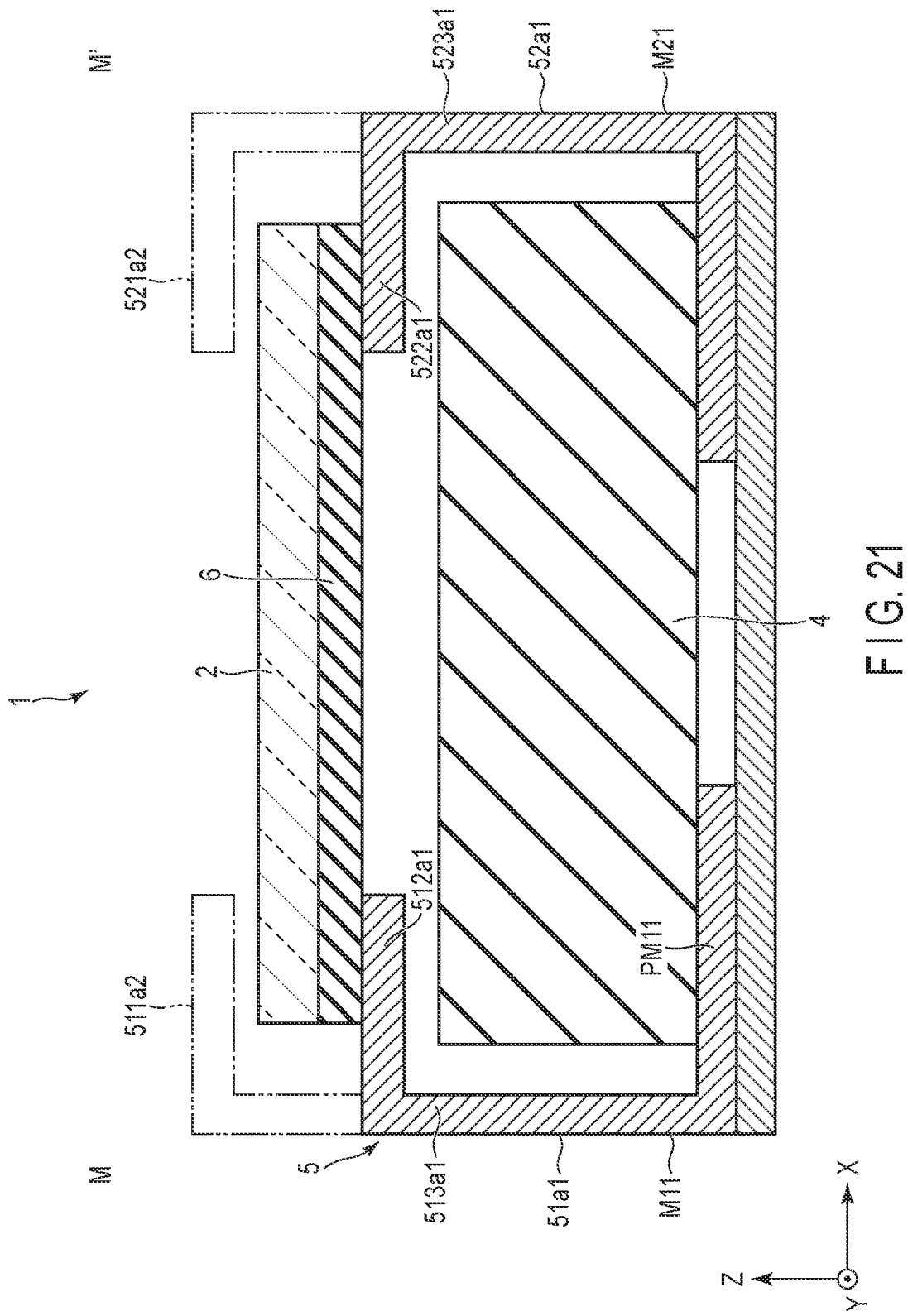
FIG. 21 is a cross-sectional view taken along line M-M' shown in FIG. 19.

FIG. 21 is a cross-sectional view taken along line M-M' shown in FIG. 19. The member M11 includes a side wall 513a1 in addition to the portion PP11 and the lug 512a1. The side wall 513a1 extends along the third direction Z at a position between the portion PP11 and the lug 512a1. The member M21 includes a side wall 523a1 in addition to the portion PP21 and the lug 522a1. The side wall 523a1 extends along the third direction Z at a position between the portion PP21 and the lug 522a1.

The display panel 2 and the optical sheet 6 are arranged on the lugs 512a1 and 522a1. In other words, the lugs 512a1 and 522a1 are located on opposite sides to the lug 511a2 of the locking portion 51a2 and the lug 521a2 of the locking portion 52a2 with the display panel 2 and the optical sheet 6 sandwiched therebetween. In the example illustrated, the optical sheet 6 is in contact with the lugs 512a1 and 522a1. In the example shown in FIG. 21, no adhesive member is interposed between the member M11 and the illumination device 4 or between the member M21 and the illumination device 4. In addition, no adhesive member is interposed between the optical sheet 6 and the lug 512a1 or between the optical sheet 6 and the lug 522a1, either. Although not shown, the cross-sectional view taken along line N-N' shown in FIG. 19 is the same as the example shown in FIG. 21. The same advantages as those of the example shown in FIG. 3 and FIG. 4 can also be obtained in the example shown in FIG. 19 to FIG. 21.

Figure 22:
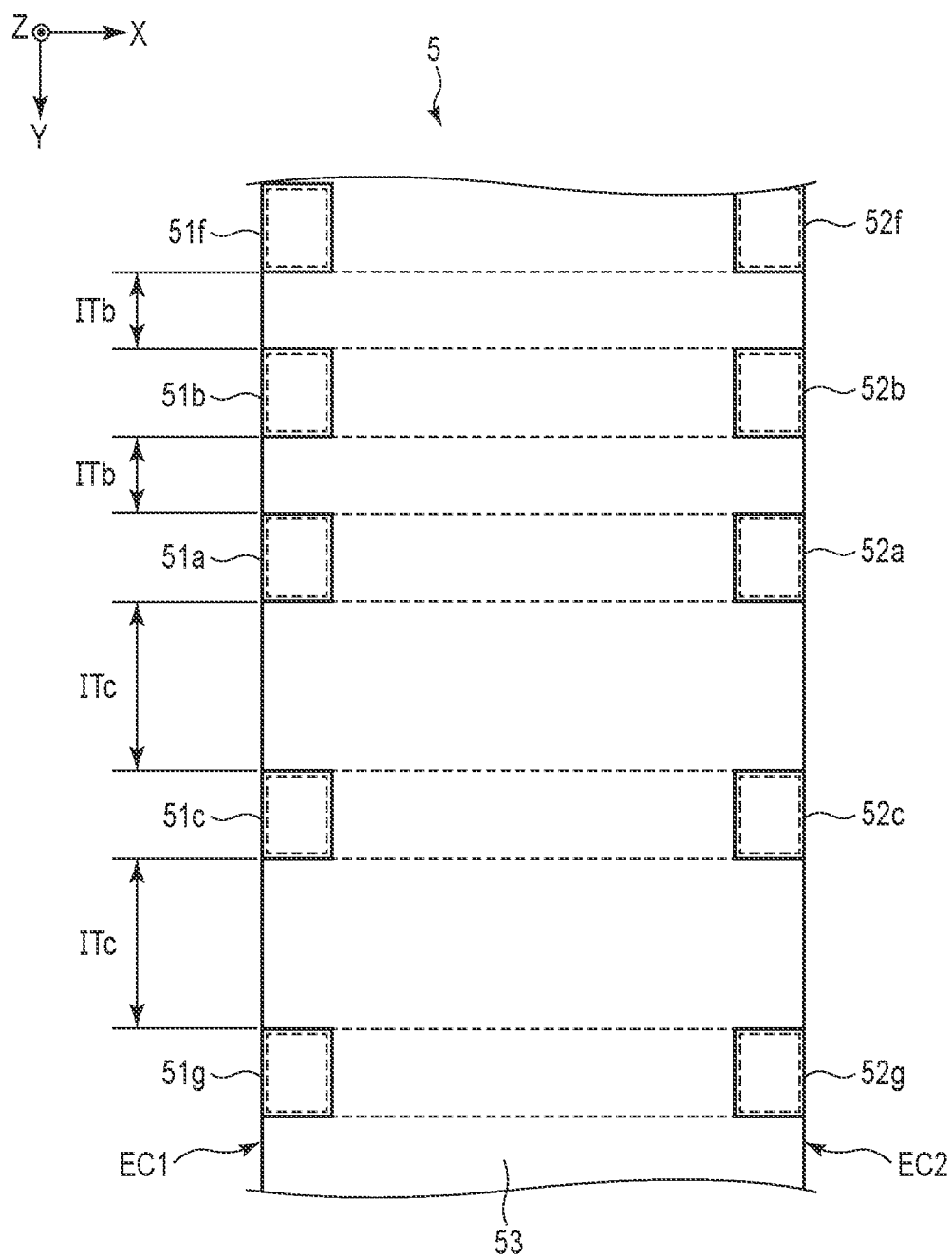
FIG. 22 is a plan view showing the other example of the casing 5.

FIG. 22 is a plan view showing the other example of the casing 5. The example shown in FIG. 22 is different from the example shown in FIG. 3 in that the interval between the locking portions 51 and 52 is not constant. On the edge part EC1 side, the locking portions 51f, 51b, 51a, 51c, and 51g are arranged in this order along the second direction Y. On the edge part EC2 side, the locking portions 52f, 52b, 52a, 52c, and 52g are arranged in this order along the second direction Y.

In the edge part EC1, an interval ITb between the locking portion 51a and the locking portion 51b is smaller than, for example, an interval ITc between the locking portion 51a and the locking portion 51c. In the example illustrated, the locking portion 51b and the locking portion 51f are arranged with the interval ITb. In addition, the locking portion 51c and the locking portion 51g are arranged with the interval ITc.

On the edge part EC2 side, the locking portions 52f, 52b, 52a, 52c, and 52g are opposed to the locking portions 51f, 51b, 51a, 51c, and 51g, respectively, along the first direction X. In other words, the locking portion 52a, the locking portion 52b, and 52f are arranged at the intervals ITb, respectively. In addition, the locking portion 52a, the locking portion 52c, and the locking portion 52g are arranged with the intervals ITc.

Figure 23:
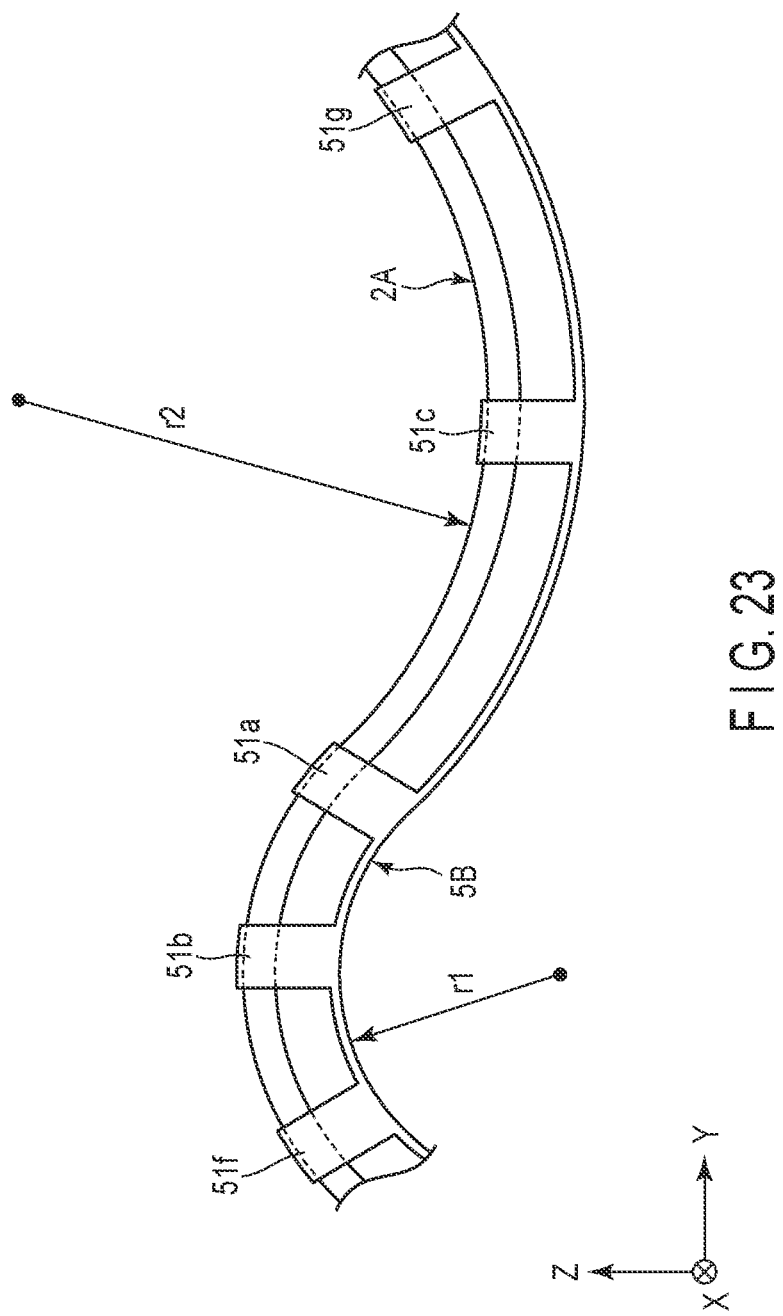
FIG. 23 is a side view showing a state in which the casing 5 shown in FIG. 22 is curved.

FIG. 23 is a side view showing a state in which the casing 5 shown in FIG. 22 is curved. The display device 1 is curved with a radius of curvature r1 in the region where the locking portions 51f, 51b, and 51a are provided. In the example illustrated, the display surface is a convex surface in the region where the locking portions 51*f*, 51*b*, and 51*a* are provided. In contrast, the display device 1 is curved with a radius of curvature r2 in the region where the locking portions 51*a*, 51*c*, and 51*g* are provided. In the example illustrated, the display surface is a concave surface in the region where the locking portions 51*a*, 51*c*, and 51*g* are provided. The radius of curvature r1 is defined on, for example, a lower surface 5B of the casing 5, and the radius of curvature r2 is defined on an upper surface 2A of the display panel 2. For example, the radius of curvature r1 is smaller than the radius of curvature r2. In other words, the locking portions 51*f*, 51*b*, and 51*a* are densely arranged in the region having a large curvature, and the locking portions 51*a*, 51*c*, and 51*g* are roughly arranged in the region having a small curvature.

In the example shown in FIG. 22 and FIG. 23, the locking portion 51*a* corresponds to a first locking portion, the locking portion 52*a* corresponds to a second locking portion, the locking portion 51*b* corresponds to a third locking portion, the locking portion 52*b* corresponds to a fourth locking portion, the locking portion 51*c* corresponds to a fifth locking portion, and the locking portion 52*c* corresponds to a sixth locking portion. The same advantages as those of the example shown in FIG. 3 and FIG. 4 can also be obtained in the example shown in FIG. 22 and FIG. 23. Furthermore, according to the example shown in FIG. 22 and FIG. 23, since the locking portions 51 and 52 are arranged at the intervals according to the curvature of the display device 1, the interval between the display panel 2 and the illumination device 4 can be appropriately maintained even in a region having a large curvature.

Figure 24:
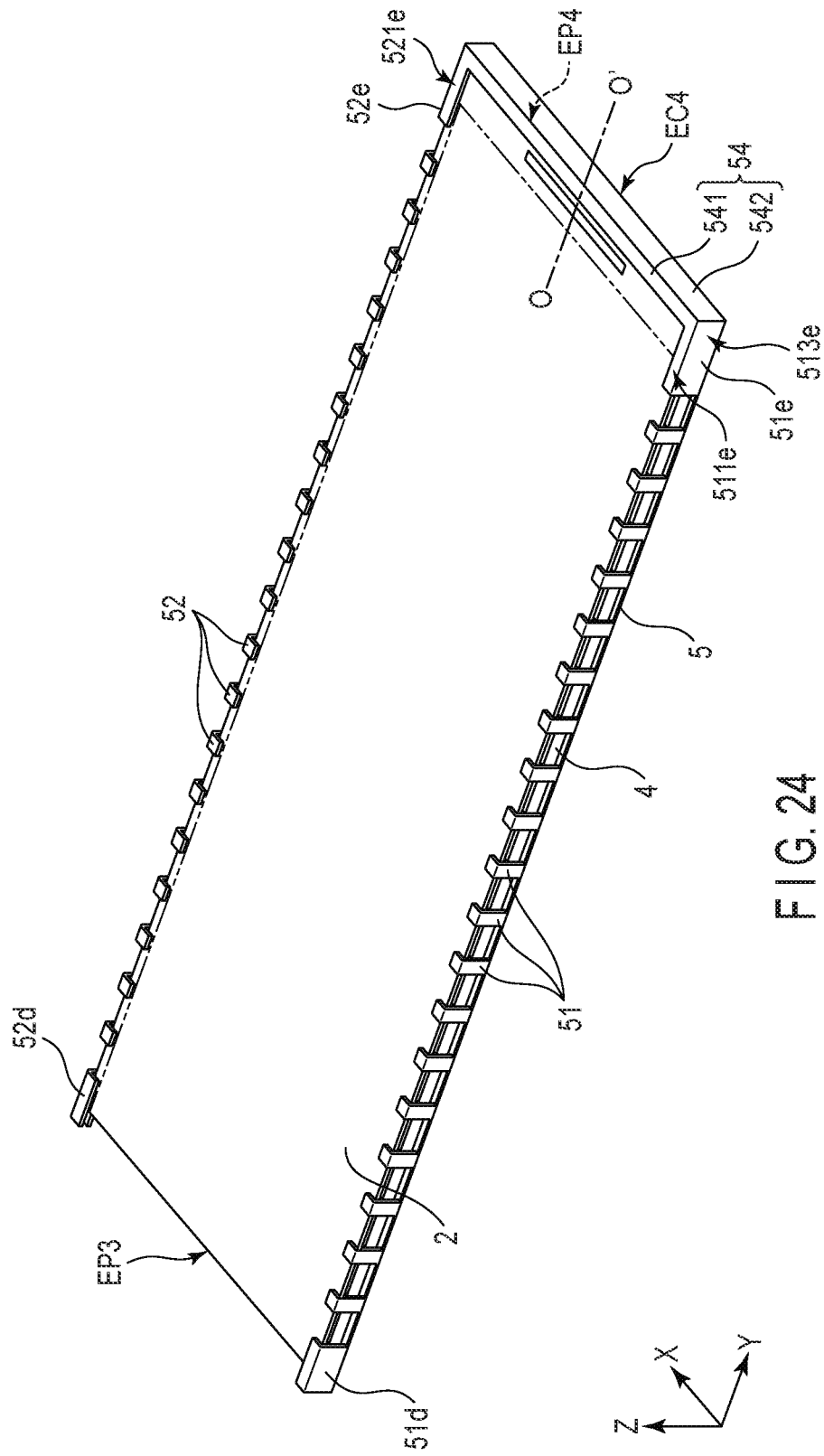
FIG. 24 is a perspective view showing the other example of the display device 1.

FIG. 24 is a perspective view showing the other example of the display device 1. The example shown in FIG. 24 is different from the example shown in FIG. 1 in that the casing 5 comprises a stopper 54. The stopper 54 is provided at, for example, the edge part EC4. Such a stopper 54 prevents the display panel 2, the illumination device 4, and the like accommodated in the casing 5 from popping out from the edge part EC4 side. In the illustrated example, the display panel 2, the illumination device 4, and the like are inserted into the casing 5 from the edge part EC3 side. Incidentally, the stopper 54 may be provided on one of the edge parts EC3 and EC4. When the stopper 54 is provided on the edge part EC3, the display panel 2, the illumination device 4, and the like are inserted into the casing 5 from the edge part EC4 side.

The stopper 54 is continuous with the locking portions 51*e* and 52*e*. In other words, the stopper 54 includes a lug 541 formed to be flush with the lug 511*e* of the locking portion 51*e* and the lug 521*e* of the locking portion 52*e*, and a side wall 542 connected to a side wall 513*e* of the locking portion 51*e* and a side wall (not shown) of the locking portion 52*e*. In the example illustrated, the side wall 542 is formed in a flat plate shape parallel to the X-Z plane.

Figure 25:
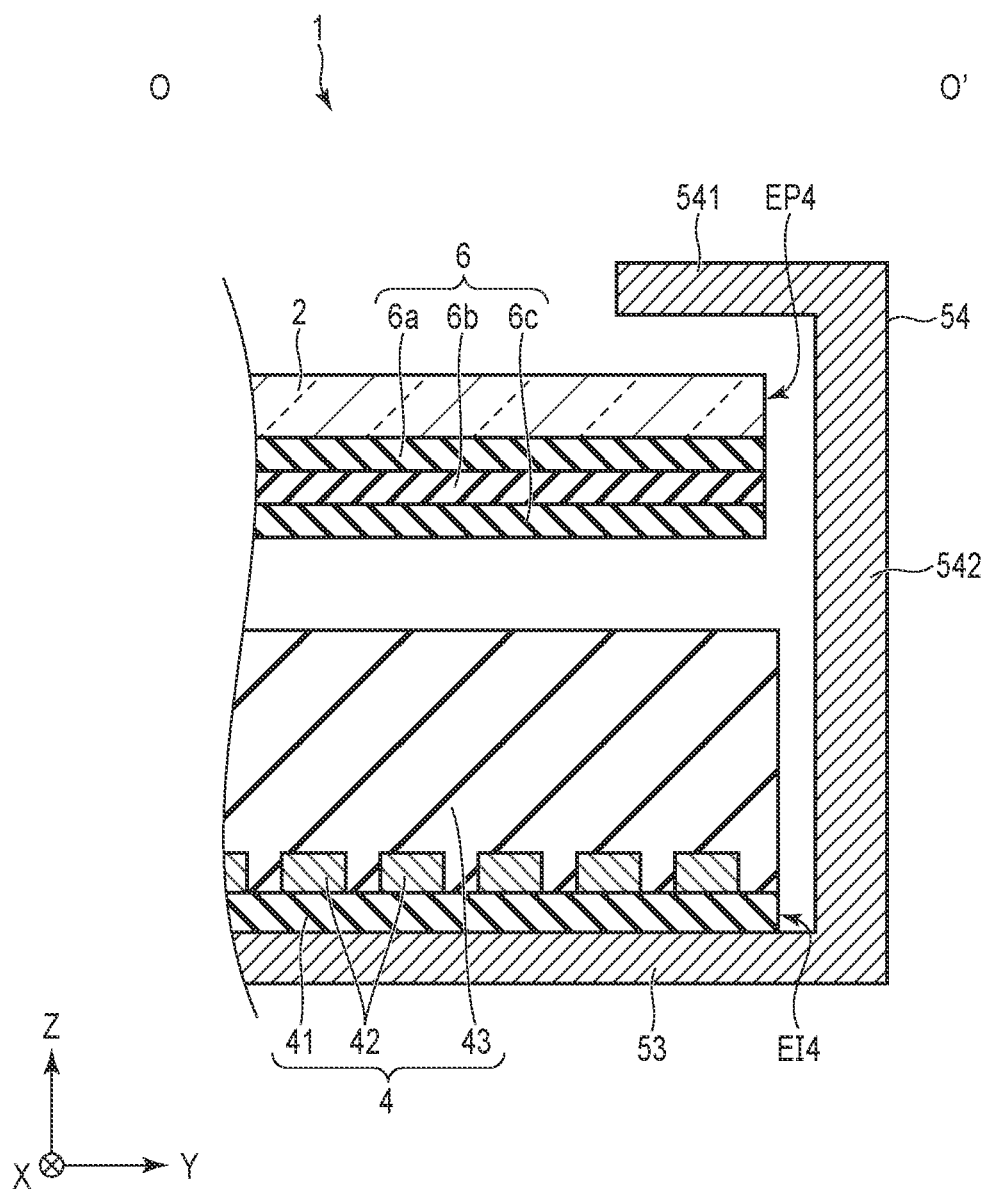
FIG. 25 is a cross-sectional view taken along line O-O' shown in FIG. 24.

FIG. 25 is a cross-sectional view taken along line O-O' shown in FIG. 24. The lug 541 extends along the first direction X at a position above the display panel 2. The side wall 542 extends along the third direction Z at a position between the lug 541 and the bottom portion 53. When the display panel 2 and the illumination device 4 slide along the circumferential direction of the curve (second direction Y in the example illustrated) according to the curvature of the display device 1, the edge part EP4 of the display panel 2 and the edge part EI4 of the illumination device 4 are made to abut on the side wall 542.

The stopper 54 includes a lug 541 and does not include a lug below the lug 541. There are two reasons mentioned below. First, even if a lug is not provided below the lug 541, the display panel 2 and the optical sheet 6 are sufficiently supported by the lug 512 of the locking portion 51 and the lug 522 of the locking portion 52. In addition, in a case where a lug is provided below the lug 541, when the display device 1 is deformed from the bent state to the flat state, the display panel 2 and the optical sheet 6 can be inserted on a lower side than the lug or the illumination device 4 can be inserted on an upper side than the lug. In other words, there is a risk that the lug may interfere with the display panel 2, the optical sheet 6, and the illumination device 4. For the above two points, the stopper 54 does not include a lug below the lug 541.

The same advantages as those of the example shown in FIG. 3 and FIG. 4 can also be obtained in the example shown in FIG. 24 and FIG. 25. Furthermore, according to the example shown in FIG. 24 and FIG. 25, the display panel 2 and the illumination device 4 abut on the stopper 54, and the display panel 2 and the illumination device 4 are thereby prevented from popping out from the casing 5.

Second Embodiment

Figure 26:
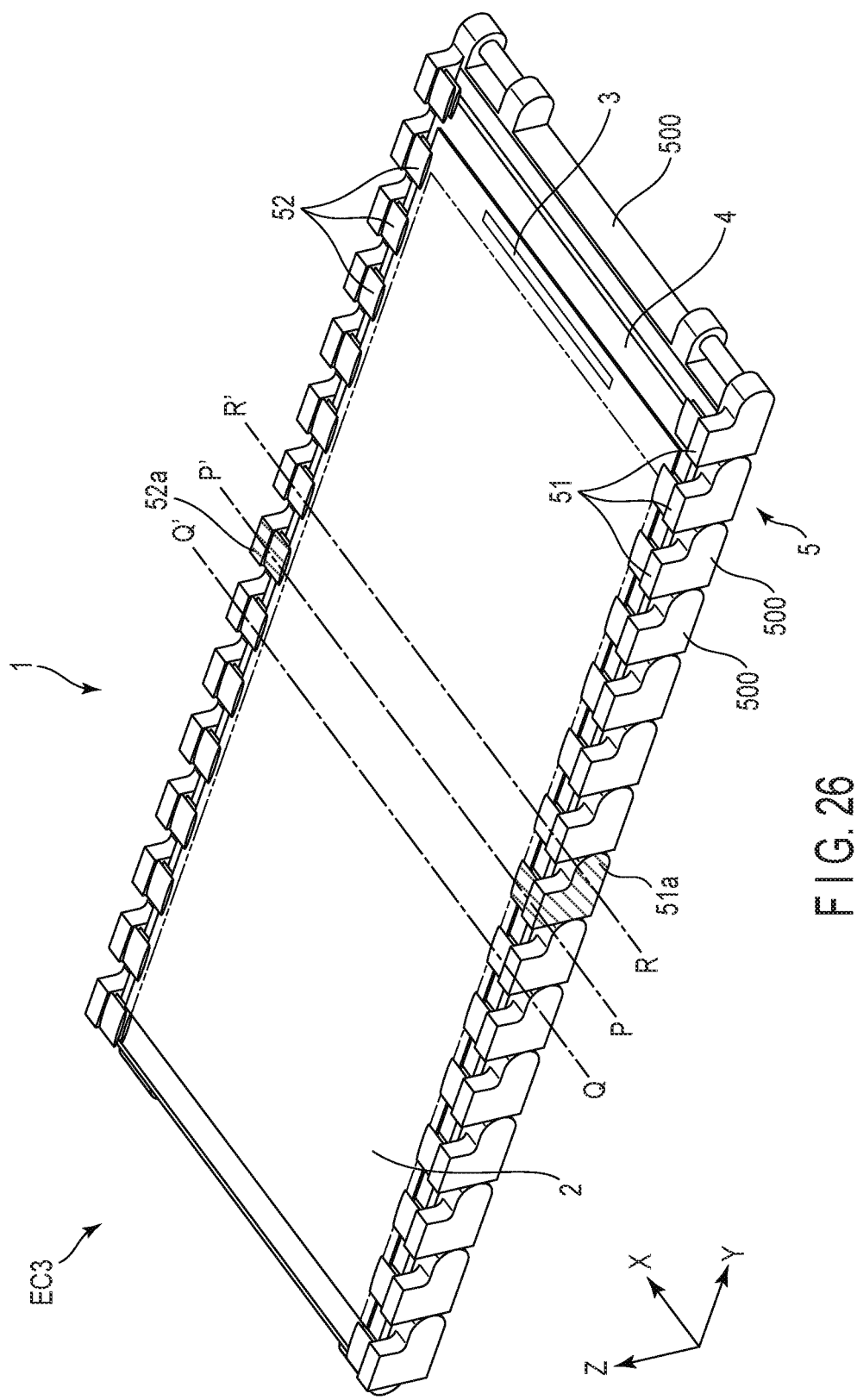
FIG. 26 is a perspective view showing an example of a display device 1 according to a second embodiment.

FIG. 26 is a perspective view showing an example of a display device 1 according to a second embodiment. The second embodiment is different from the first embodiment in that a casing 5 is formed of a plurality of pieces 500. Each of the pieces 500 comprises locking portions 51 and 52. In the second embodiment, too, a display panel 2 and an illumination device 4 are fixed to locking portions 51*a* and 52*a* located at a center of a width of the display device 1 along the second direction Y as represented by hatch lines.

Figure 27:
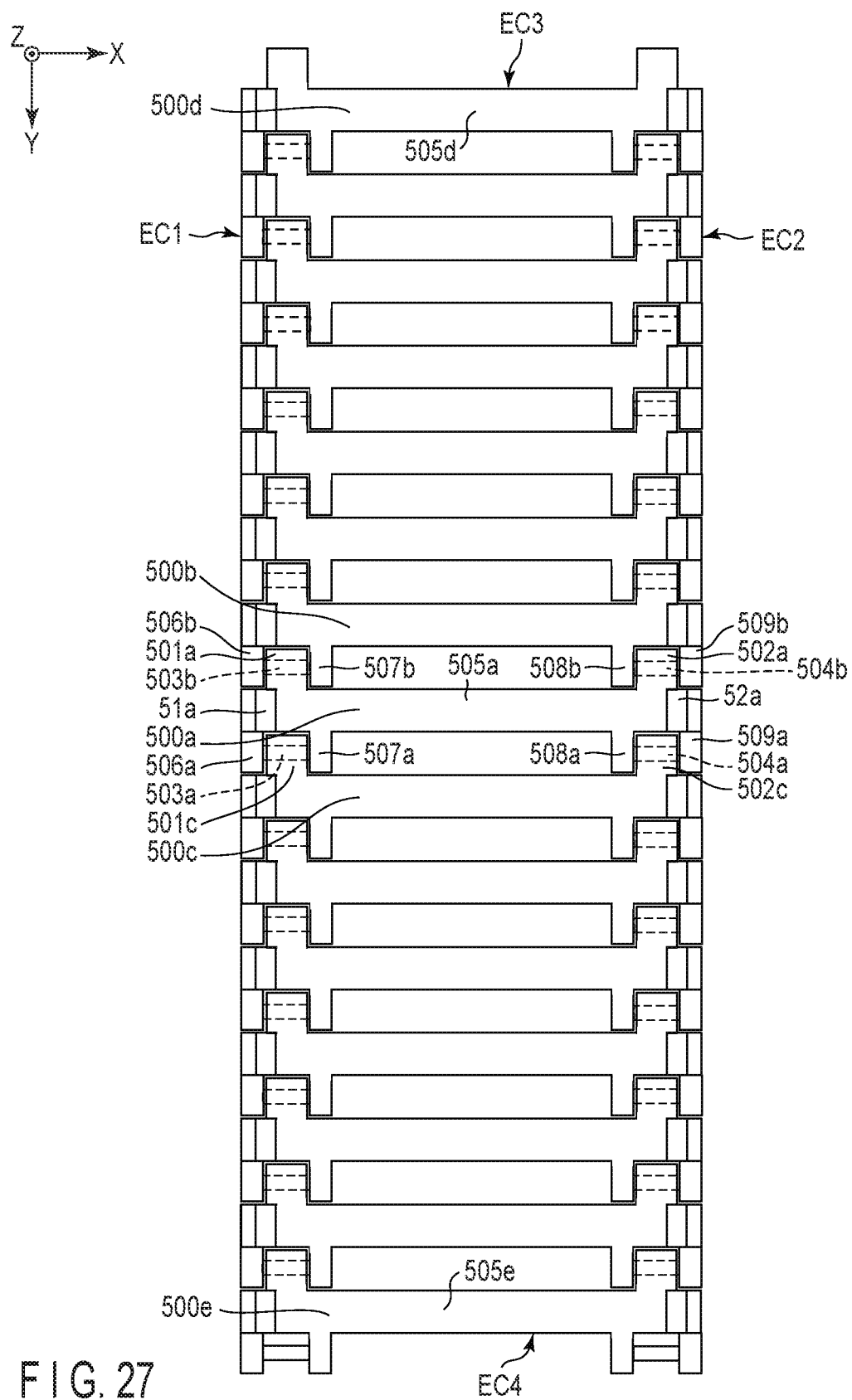
FIG. 27 is a plan view showing the casing 5 shown in FIG. 26.

FIG. 27 is a plan view showing the casing 5 shown in FIG. 26. The pieces 500 are connected to each other along the second direction Y to form the casing 5 having a substantially rectangular shape in planar view. Therefore, the casing 5 includes edge parts EC1 and EC2 extending along the second direction Y and edge parts EC3 and EC4 extending along the first direction X, similarly to the first embodiment. Incidentally, the second direction Y corresponds to the connecting direction of the pieces 500.

The configuration of the piece 500 will be described below by taking a piece 500*a* located at the center of the casing 5 in the second direction Y as an example. The other pieces 500 have the same configuration. The piece 500*a* includes a main portion 505*a*, connecting portions 501*a* and 502*a*, connecting pins 503*a* and 504*a*, protrusions 506*a*, 507*a*, 508*a*, and 509*a*, and locking portions 51*a* and 52*a*.

The main portion 505*a* extends along the first direction X. The locking portions 51*a* and 52*a* are located at both ends of the main portion 505*a* in the first direction X. The connecting portions 501*a* and 502*a* protrude from the main portion 505*a* along the second direction Y. In the example illustrated, the connecting portions 501*a* and 502*a* protrude from the main portion 505*a* toward the edge part EC3 side. For example, the connecting portion 501*a* is located on the edge part EC1 side, and the connecting portion 502*a* is located on the edge part EC2 side. Each of the connecting portions 501*a* and 502*a* includes a through hole (corresponding to through holes H1 and H2 to be described later) extending along the first direction X. The protrusions 506*a* and 507*a* protrude from the main portion 505*a* to a side opposite to the connecting portion 501*a*. In other words, the protrusions 506*a* and 507*a* protrude from the main portion 505*a* toward the edge part EC4 side on the edge part EC1 side. The connecting pin 503*a* extends along the first direction X at a position between the protrusion 506*a* and the protrusion 507a. The protrusions 508a and 509a protrude from the main portion 505a to the side opposite to the connecting portion 502a. In other words, the protrusions 508a and 509a protrude from the main portion 505a toward the edge part EC4 side on the edge part EC2 side. The connecting pin 504a extends along the first direction X at a position between the protrusion 508a and the protrusion 509a.

Each of the pieces 500 is rotatably connected to the adjacent pieces 500 about the connecting pins 503 and 504. More specifically, the connecting portion 501 of the adjacent piece 500 is fitted between the protrusion 506 and the protrusion 507, and the connecting portion 502 of the adjacent piece 500 is fitted between the protrusion 508 and the protrusion 509. Furthermore, the connecting pins 503 and 504 are inserted into the through holes of the connecting portions 501 and 502 of the adjacent pieces 500, respectively.

For example, the connecting pins 503a and 504a of the piece 500a are inserted into the through holes provided in the connecting portions 501c and 502c of the piece 500c, respectively. At this time, the connecting portion 501c is fitted between the protrusion 506a and the protrusion 507a of the piece 500a, and the connecting portion 502c is fitted between the protrusion 508a and the protrusion 509a of the piece 500a. For example, the connecting pins 503b and 504b of the piece 500b are inserted into the through holes provided in the connecting portions 501a and 502a of the piece 500a, respectively. At this time, the connecting portion 501a is fitted between the protrusion 506b and the protrusion 507b of the piece 500b, and the connecting portion 502a is fitted between the protrusion 508b and the protrusion 509b of the piece 500b. The pieces 500b and 500c are pieces adjacent to the piece 500a. In the example illustrated, the piece 500b is closer to the edge part EC3 than the piece 500a, and the piece 500c is closer to the edge part EC4 than the piece 500a.

In the casing 5 in which the pieces 500 are connected as described above, the locking portions 51 and the protrusions 506 are alternately arranged along the second direction Y to form the edge part EC1. The locking portions 52 and the protrusions 509 are alternately arranged along the second direction Y to form the edge part EC2. In addition, a side edge of the main portion 505d of the piece 500d forms the edge part EC3. A side edges of the main portion 505e of the piece 500e forms the edge part EC4. The pieces 500d and 500e are pieces located at both ends of the second direction Y in the casing 5. In addition, the main portion 505 of each piece 500 forms the bottom portion 53 of the casing 5.

Since each of the pieces 500 includes locking portions 51 and 52 arranged in the first direction X and since a plurality of pieces 500 are arranged in the second direction Y, a pair of locking portions 51 and 52 included in each of the pieces 500 are also located equidistantly from the edge part EC3 in the second direction Y, in the present embodiment. In the example illustrated, the casing 5 is formed of fifteen pieces 500, but the number of pieces 500 constituting the casing 5 can be appropriately changed. In addition, in the example illustrated, lengths of the edge parts EC1 and EC2 are larger than lengths of the ends EC3 and EC4, but the lengths of the edge parts EC1 and EC2 may be equal to or less than the lengths of the edge parts EC3 and EC4.

Figure 28:
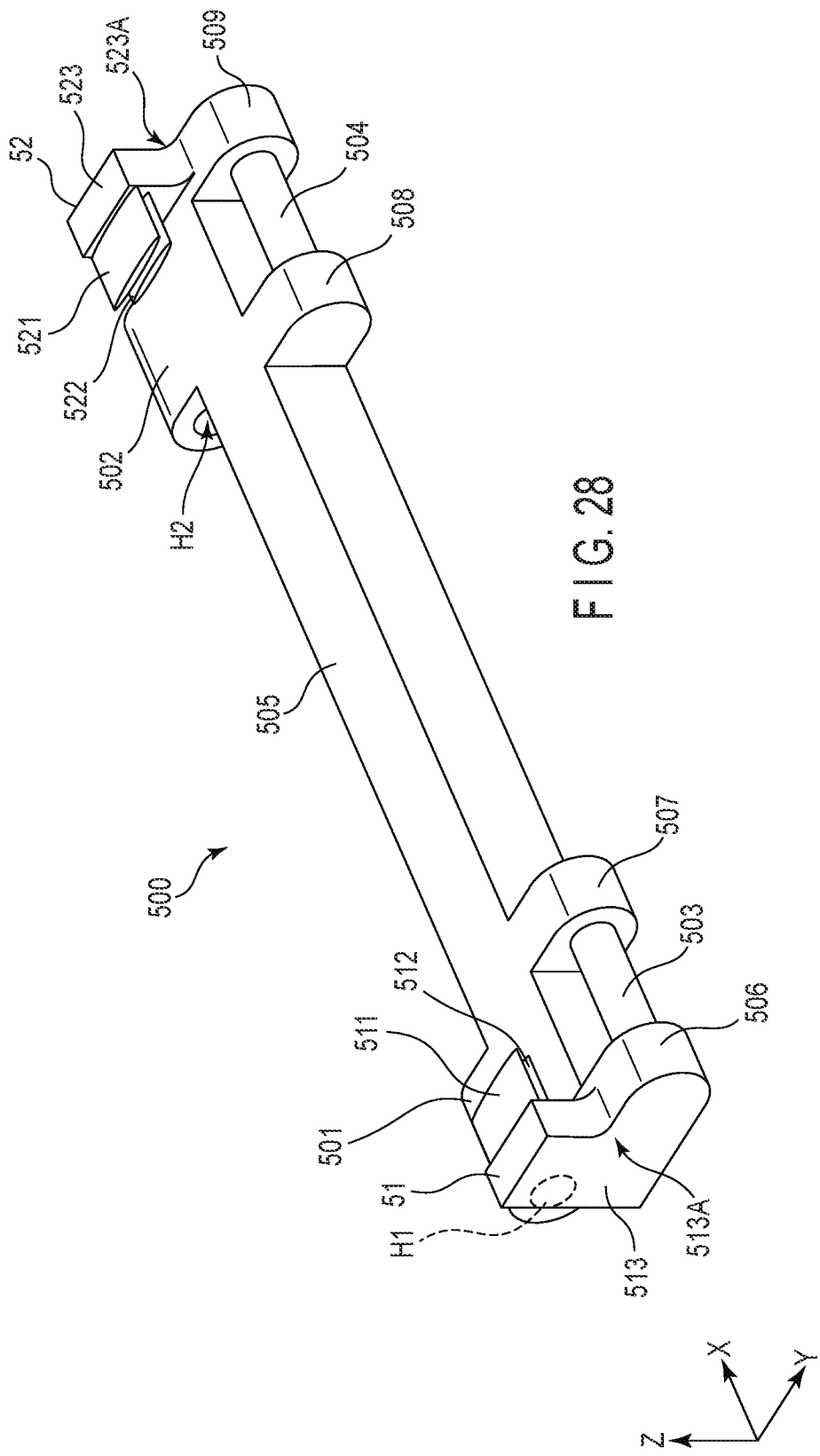
FIG. 28 is an expanded view showing the piece 500 shown in FIG. 27.

FIG. 28 is an expanded view showing the piece 500 shown in FIG. 27. The locking portion 51 includes lugs 511 and 512 and a side wall 513. The lugs 511 and 512 protrude from the side wall 513 toward the locking portion 52 side. The locking portion 52 includes lugs 521 and 522 and a side wall 513. The lugs 521 and 522 protrude from the side wall 523 toward the locking portion 51. The side walls 513 and 523 are located at both ends of the main portion 505. The lugs 511, 512, 521, and 522 are located above the main portion 505 and extend along the first direction X. In the example illustrated, the lugs 511, 512, 521, and 522 have an elliptical cross section in the X-Z plane. With such a shape, the contact area with the display panel 2 and the illumination device 4 can be reduced.

For example, the main portion 505 is formed in a substantially rectangular parallelepiped shape extending along the first direction X. The connecting portion 501 includes a through hole H1. The connecting portion 502 includes a through hole H2. The through hole H1 and the through hole H2 are located in the same linear shape. The protrusion 506 is continuous with the side wall 513 and, in the example illustrated, forms a surface 513A common to the side wall 513. The protrusion 509 is continuous with the side wall 523 and, in the illustrated example, forms a surface 523A common to the side wall 523. The surfaces 513A and 523A are parallel to, for example, the Y-Z plane. The connecting pins 503 and 503 are formed in a substantially columnar shape.

The casing 5 as described above can be integrally formed with the pieces 500 connected to each other by, for example, a 3D printer or the like. Alternatively, the casing 5 may be formed by urging the connecting portion 501 to be fitted between the protrusion 506 and the protrusion 507, causing the connecting portion 502 to be fitted between the protrusion 508 and the protrusion 509, then inserting the separately prepared connecting pin 503 into the through hole H1, and inserting the connecting pin 504 into the through hole H2.

Figure 29:
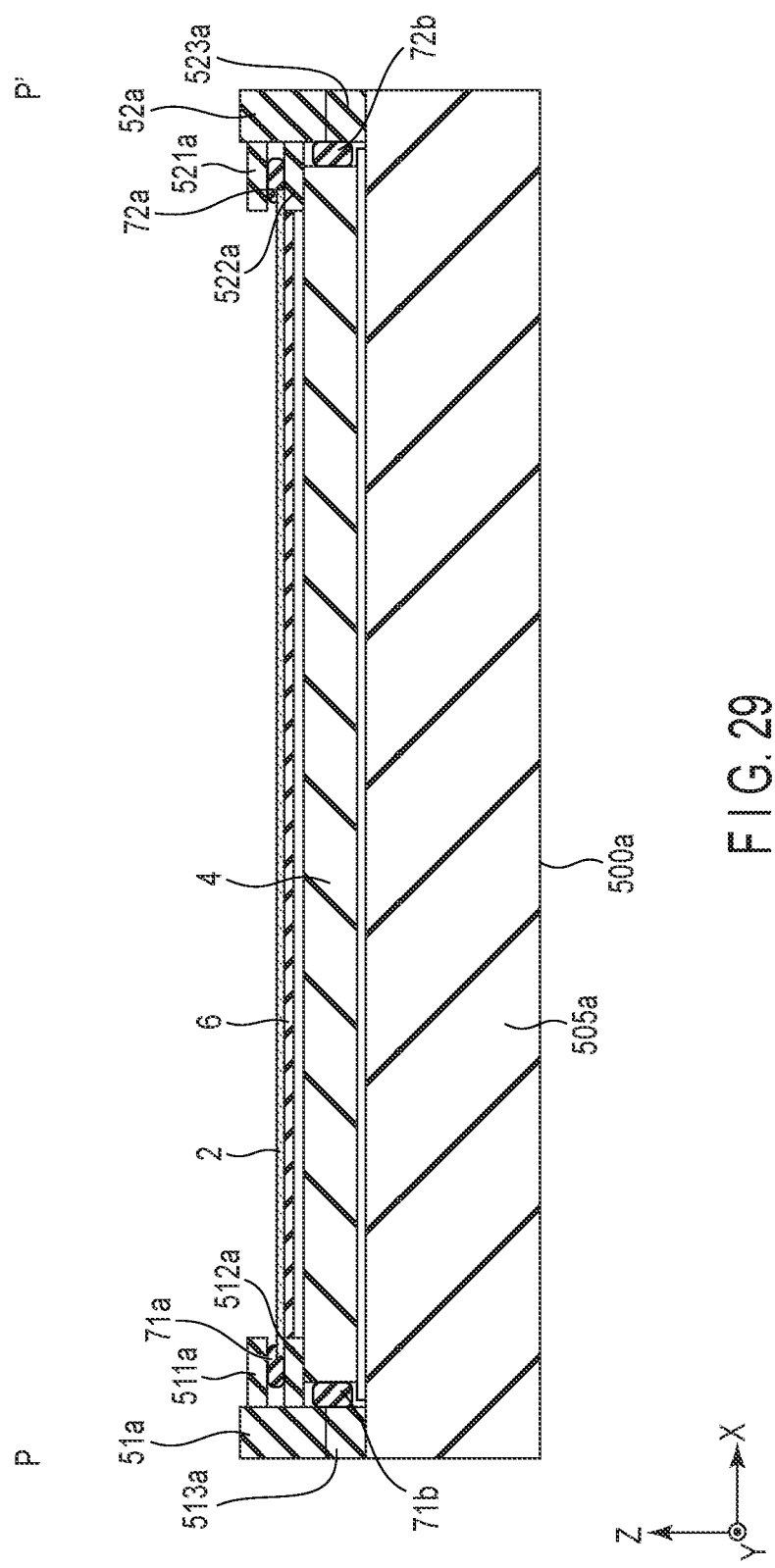
FIG. 29 is a cross-sectional view taken along line P-P' shown in FIG. 26.

FIG. 29 is a cross-sectional view taken along line P-P' shown in FIG. 26. The display panel 2 is located between a lug 511a and a lug 512a, and between a lug 521a and a lug 522a. In the example illustrated, the optical sheet 6 is adhered to a lower surface of the display panel 2, and its side surface is in contact with the lug 521a and the lug 522a. The display panel 2 is adhered to the lugs 511a and 512a by a first adhesive member 71a, and is adhered to the lugs 521a and 522a by a second adhesive member 72a. The illumination device 4 is located between the lug 512a and the main portion 505a, and between the lug 522a and the main portion 505a. In the example illustrated, the illumination device 4 is adhered to a side wall 513a2 by the first adhesive member 71b and is adhered to a side wall 523a2 by the second adhesive member 72b.

Figure 30:
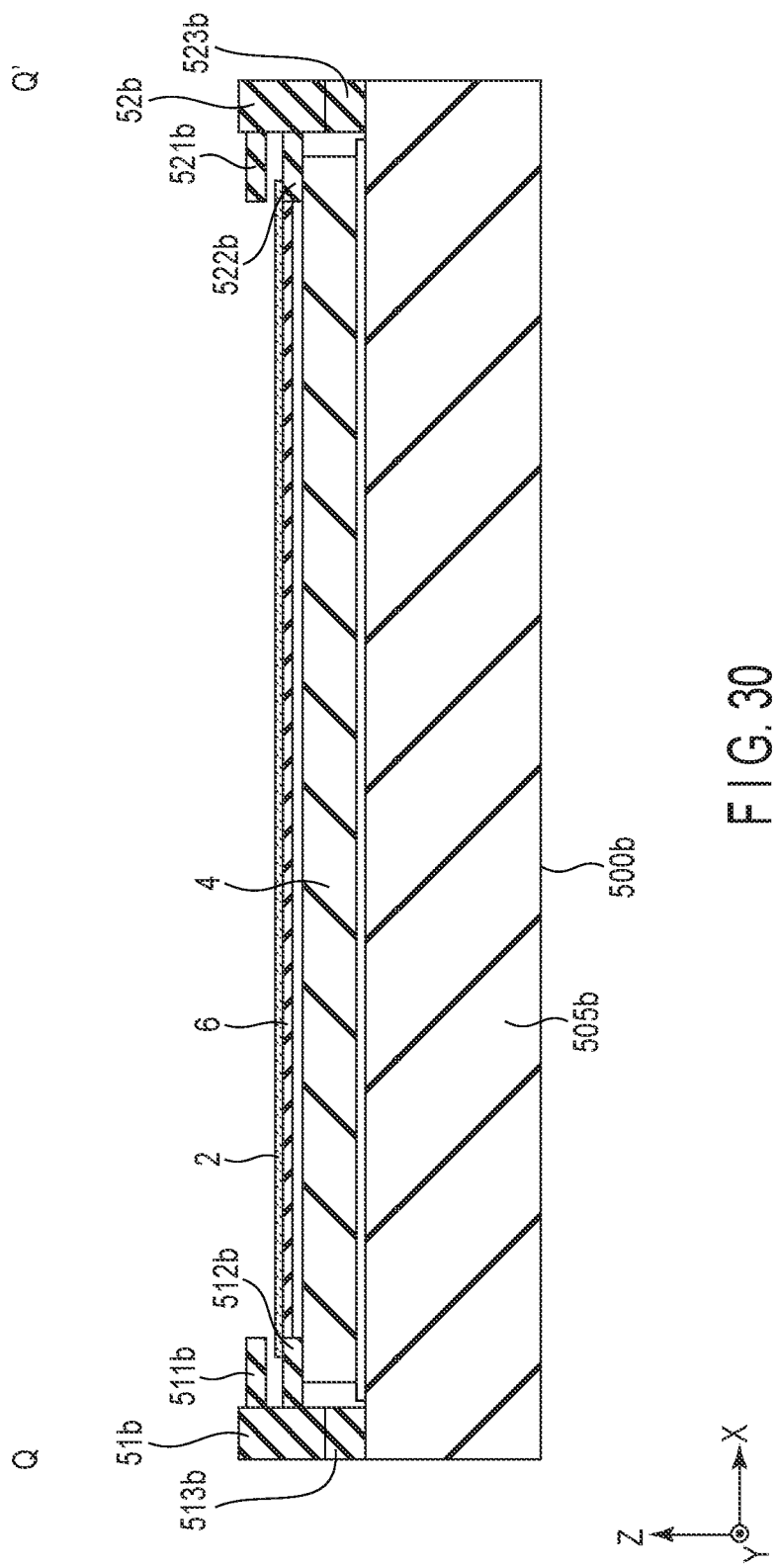
FIG. 30 is a cross-sectional view taken along line Q-Q' shown in FIG. 26.

FIG. 30 is a cross-sectional view taken along line Q-Q' shown in FIG. 26. No adhesive member is interposed between the piece 500b and the display panel 2, the optical sheet 6, and the illumination device 4. In addition, although not shown, this matter is also applied to the cross section taken along line R-R' shown in FIG. 27.

Figure 31:
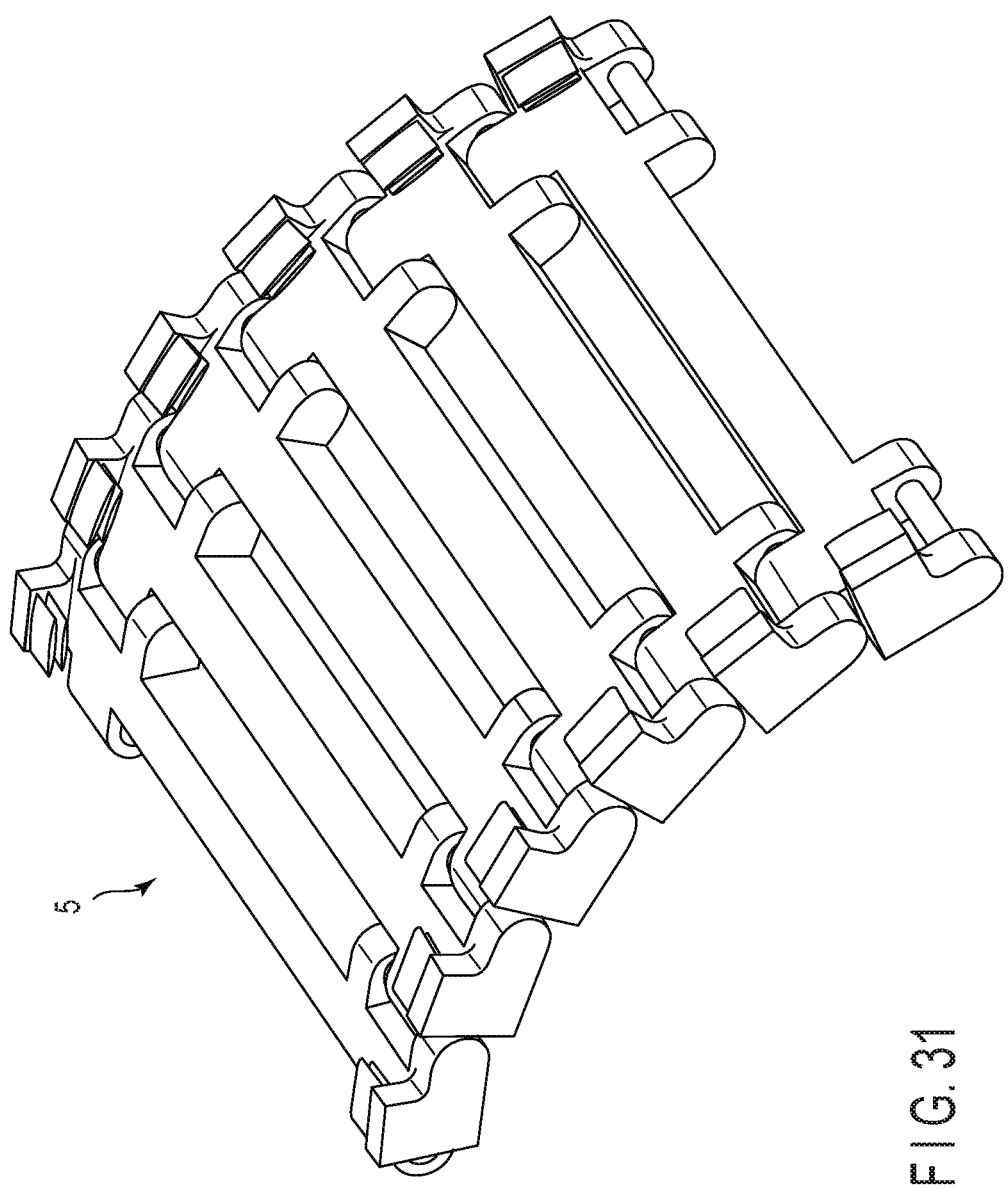
FIG. 31 is a view showing a state in which the casing 5 according to the present embodiment is curbed.

FIG. 31 is a view showing a state in which the casing 5 according to the present embodiment is curbed. The piece 500 is rotatably connected about the connecting pins 503 and 504 extending parallel to the first direction X. Therefore, the casing 5 can easily be curbed about a bending axis parallel to the first direction X. At this time, the repulsive force of the casing 5 is hardly generated.

In the second embodiment, the locking portion 51 corresponds to a first locking portion, the lug 511 corresponds to a first lug, the lug 512 corresponds to a third lug, the locking portion 52 corresponds to a second locking portion, the lug 521 corresponds to a second lug, and the lug 522 corresponds to a fourth lug. In the second embodiment, the same advantages as those of the first embodiment can also be obtained since the locking portion 51 includes the lugs 511 and 512, the locking portion 52 includes the lugs 521 and 522, and the display panel 2 and the illumination device 4 are adhered to the locking portions 51a and 52a by the pair of the first adhesive members 71 and the second adhesive member 72 arranged along the first direction X. Furthermore, according to the second embodiment, as described with reference to FIG. 31, the display device 1 can be curved with substantially no repulsive force of the casing 5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device obtained from the configuration disclosed herein is added below.

(1)
A display device comprising:
a display panel;
an illumination device overlapping the display panel;
a casing accommodating the display panel and the illumination device; and
a first adhesive member and a second adhesive member adhering the display panel and the illumination device to the casing,
the casing including:
a bottom portion supporting the illumination device;
a first edge part and a second edge part arranged in a first direction and extending along a second direction intersecting the first direction;
a third edge part extending along the first direction at a position between the first edge part and the second edge part;
a first locking portion provided at the first edge part; and
a second locking portion provided at the second edge part, wherein
the first adhesive member adheres the display panel to the first locking portion,
the second adhesive member adheres the display panel to the second locking portion,
the first locking portion and the second locking portion are located equidistantly from the third edge part in the second direction.

(2)
The display device according to (1), wherein
the first locking portion includes a first side wall extending in a third direction intersecting the first direction and the second direction, and a first lug protruding from the first side wall toward the second edge part side,
the second locking portion includes a second side wall extending in the third direction, and a second lug protruding from the second side wall toward the first edge part side, and
the first lug and the second lug are located equidistantly from the bottom portion in the third direction.

(3)
The display device according to (2), wherein
the first locking portion includes a third lug extending from the first side wall toward the second edge part side,
the second locking portion includes a fourth lug protruding from the second side wall toward the first edge part side, and
the display panel is located between the first lug and the third lug, and between the second lug and the fourth lug.

(4)
The display device according to (2), wherein
the casing further comprises:
a third locking portion provided at the first edge part and adjacent to the first locking portion; and
a fourth locking portion provided at the second edge part and adjacent to the second locking portion,
the third locking portion includes a third side wall extending in the third direction, and a fifth lug protruding from the third side wall toward the second edge part side,
the fourth locking portion includes a fourth side wall extending in the third direction, and a sixth lug protruding from the fourth side wall toward the first edge part side,
the third locking portion and the fourth locking portion are located equidistantly from the third edge part in the second direction, and
the fifth lug and the sixth lug are located equidistantly from the bottom portion in the third direction.

(5)
The display device according to (4), wherein
the first lug and the fifth lug are located on sides opposite to each other with the display panel interposed therebetween, and
the second lug and the sixth lug are located on sides opposite to each other with the display panel interposed therebetween.

(6)
The display device according to (4) or (5), wherein
the casing further comprises:
a fifth locking portion being on a side opposite to the third locking portion and adjacent to the first locking portion, at the first edge; and
a sixth locking portion provided on a side opposite to the fourth locking portion and adjacent to the second locking portion, at the second edge part,
the fifth locking portion and the sixth locking portion are located equidistantly from the third edge part, and
an interval between the first locking portion and the third locking portion is different from an interval between the first locking portion and the fifth locking portion, in the second direction.

(7)
The display device of one according to (2) to (6), wherein
the display panel includes a fourth edge part opposed to the third edge part,
the casing further comprises a seventh locking portion provided at the first edge part,
the seventh locking portion includes a seventh side wall extending in the third direction, and a seventh lug protruding from the seventh side wall toward the second edge part side, and
the seventh lug overlaps the fourth edge part.

(8)
The display device according to (7), wherein
a width of the seventh lug is larger than a width of the first lug, in the second direction.

(9)
The display device of one according to (2) to (8), wherein
the first adhesive member adheres the display panel and the bottom portion, at a position overlapping the first lug, and
the second adhesive member adheres the display panel and the bottom portion, at a position overlapping the second lug.

(10)
A display device comprising:
a display panel;
an illumination device overlapping the display panel;
a casing accommodating the display panel and the illumination device; and
a first adhesive member and a second adhesive member adhering the display panel and the illumination device to the casing,
the casing including:
a first locking portion including a first lug and a third lug sandwiching the display panel; and
a second locking portion arranged opposite to the first locking portion and including a second lug and a fourth lug sandwiching the display panel, wherein
the first adhesive member adheres the display panel and the illumination device to the first locking portion,
the second adhesive member adheres the display panel and the illumination device to the second locking portion,
the first locking portion and the second locking portion are arranged along a bending axis.

(11)
The display device according to (10), wherein
the casing is formed of a plurality of pieces connected along a connecting direction intersecting the bending axis, and
the piece includes:
a main portion extending along the bending axis;
a connecting portion protruding from the main portion in the connecting portion;
a connecting pin located on a side opposite to the connecting portion with the main portion sandwiched therebetween, and extending along the bending axis; and
the first locking portion and the second locking portion located at both ends of the main portion.

(12)
A storing body comprising:
a bottom portion;
a first edge part and a second edge part arranged along a firsts direction and extending in a second direction intersecting the first direction;
a plurality of first locking portions provided at the first edge part;
a plurality of second locking portions provided at the second edge part and opposed to the plurality of first locking portions in the first direction; and
adhesive members being provided at one of the plurality of first locking portions, and one of the plurality of second locking portions opposed to the one of the plurality of first locking portions, respectively, wherein
the first locking portion and the second locking portion are arranged at regular intervals in the second direction,
the first locking portion includes a first side wall extending in a third direction intersecting the first direction and the second direction, and a first lug protruding from the first side wall toward the second edge part side,
the second locking portion includes a second side wall extending in the third direction, and a second lug protruding from the second side wall toward the first edge part side,
the first lug and the second lug are located equidistantly from the bottom portion in the third direction.

What is claimed is:
1. A display device comprising:
a display panel;
an illumination device overlapping the display panel;
a casing accommodating the display panel and the illumination device; and
a first adhesive member and a second adhesive member adhering the display panel and the illumination device to the casing,
the casing including:
a bottom portion supporting the illumination device;
a first edge part and a second edge part arranged in a first direction and extending along a second direction intersecting the first direction;
a third edge part extending along the first direction at a position between the first edge part and the second edge part;
a first locking portion provided at the first edge part; and
a second locking portion provided at the second edge part, wherein
the first adhesive member adheres the display panel to the first locking portion,
the second adhesive member adheres the display panel to the second locking portion,
the first locking portion and the second locking portion are located equidistantly from the third edge part in the second direction,
the first locking portion includes a first side wall extending in a third direction intersecting the first direction and the second direction, and a first lug protruding from the first side wall toward the second edge part side,
the second locking portion includes a second side wall extending in the third direction, and a second lug protruding from the second side wall toward the first edge part side, and
the first lug and the second lug are located equidistantly from the bottom portion in the third direction.

2. The display device according to claim 1, wherein
the first locking portion includes a third lug extending from the first side wall toward the second edge part side,
the second locking portion includes a fourth lug protruding from the second side wall toward the first edge part side, and
the display panel is located between the first lug and the third lug, and between the second lug and the fourth lug.

3. The display device according to claim 1, wherein
the casing further comprises:
a third locking portion provided at the first edge part and adjacent to the first locking portion; and
a fourth locking portion provided at the second edge part and adjacent to the second locking portion,
the third locking portion includes a third side wall extending in the third direction, and a fifth lug protruding from the third side wall toward the second edge part side,
the fourth locking portion includes a fourth side wall extending in the third direction, and a sixth lug protruding from the fourth side wall toward the first edge part side, the third locking portion and the fourth locking portion are located equidistantly from the third edge part in the second direction, and the fifth lug and the sixth lug are located equidistantly from the bottom portion in the third direction.

4. The display device according to claim 3, wherein the first lug and the fifth lug are located on sides opposite to each other with the display panel interposed therebetween, and the second lug and the sixth lug are located on sides opposite to each other with the display panel interposed therebetween.

5. The display device according to claim 3, wherein the casing further comprises:

a fifth locking portion being on a side opposite to the third locking portion and adjacent to the first locking portion, at the first edge; and a sixth locking portion provided on a side opposite to the fourth locking portion and adjacent to the second locking portion, at the second edge part, the fifth locking portion and the sixth locking portion are located equidistantly from the third edge part, and an interval between the first locking portion and the third locking portion is different from an interval between the first locking portion and the fifth locking portion, in the second direction.

6. The display device according to claim 1, wherein the display panel includes a fourth edge part opposed to the third edge part, the casing further comprises a seventh locking portion provided at the first edge part, the seventh locking portion includes a seventh side wall extending in the third direction, and a seventh lug protruding from the seventh side wall toward the second edge part side, and the seventh lug overlaps the fourth edge part.

7. The display device according to claim 6, wherein a width of the seventh lug is larger than a width of the first lug, in the second direction.

8. The display device according to claim 1, wherein the first adhesive member adheres the display panel and the bottom portion, at a position overlapping the first lug, and the second adhesive member adheres the display panel and the bottom portion, at a position overlapping the second lug.

9. A display device comprising:

a display panel;

an illumination device overlapping the display panel;

a casing accommodating the display panel and the illumination device; and a first adhesive member and a second adhesive member adhering the display panel and the illumination device to the casing, the casing including:

a first locking portion including a first lug and a third lug sandwiching the display panel; and a second locking portion arranged opposite to the first locking portion and including a second lug and a fourth lug sandwiching the display panel, wherein the first adhesive member adheres the display panel and the illumination device to the first locking portion, the second adhesive member adheres the display panel and the illumination device to the second locking portion, and the first locking portion and the second locking portion are arranged along a bending axis.

10. The display device according to claim 9, wherein the casing is formed of a plurality of pieces connected along a connecting direction intersecting the bending axis, and the piece includes:

a main portion extending along the bending axis;

a connecting portion protruding from the main portion in the connecting portion;

a connecting pin located on a side opposite to the connecting portion with the main portion sandwiched therebetween, and extending along the bending axis; and the first locking portion and the second locking portion located at both ends of the main portion.

* * * * *